(12) United States Patent
Niwano et al.

(10) Patent No.: US 9,402,071 B2
(45) Date of Patent: Jul. 26, 2016

(54) DISPLAY DEVICE

(71) Applicant: MITSUBISHI ELECTRIC CORPORATION, Tokyo (JP)

(72) Inventors: Yasunori Niwano, Tokyo (JP); Toshiaki Fujino, Tokyo (JP); Yoshimitsu Ishikawa, Tokyo (JP); Syuichi Kira, Tokyo (JP); Shingo Nagano, Tokyo (JP); Kazuhiro Ishiguchi, Tokyo (JP); Kazunori Okumoto, Tokyo (JP); Akimasa Yuuki, Tokyo (JP); Tetsuya Satake, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 179 days.

(21) Appl. No.: 14/034,392

(22) Filed: Sep. 23, 2013

(65) Prior Publication Data

US 2014/0085439 A1  Mar. 27, 2014

(30) Foreign Application Priority Data

Sep. 27, 2012  (JP) .................................. 2012-213600

(51) Int. Cl.
*H04N 13/04* (2006.01)

(52) U.S. Cl.
CPC ....... *H04N 13/0413* (2013.01); *H04N 13/0475* (2013.01)

(58) Field of Classification Search
CPC .............. H04N 13/0402; H04N 13/04; H04N 2213/001; G02B 27/2214; G02B 27/2228; G09G 5/14; G09G 2300/023; G09G 5/003; G09G 3/30; G09G 3/3611; G09G 2300/0426
See application file for complete search history.

(56) References Cited

U.S. PATENT DOCUMENTS

| 6,970,290 B1 | 11/2005 | Mashitani et al. |
| 2004/0263748 A1 | 12/2004 | Park et al. |

(Continued)

FOREIGN PATENT DOCUMENTS

| CN | 2524331 Y | 12/2002 |
| CN | 102566066 A | 7/2012 |

(Continued)

OTHER PUBLICATIONS

The First Office Action issued by the State Intellectual Property Office of People's Republic of China on Nov. 12, 2015, which corresponds to Chinese Patent Application No. 201310448121.8 and is related to U.S. Appl. No. 14/034,392; with English language partial translation.

(Continued)

*Primary Examiner* — Jay Au Patel
*Assistant Examiner* — Neil Mikeska
(74) *Attorney, Agent, or Firm* — Studebaker & Brackett PC

(57) ABSTRACT

The display device includes a display panel on which sub-pixel pairs are arranged in a lateral direction, and a parallax barrier shutter panel on which sub-openings that can be changed between a light transmittance state and a light-shielding state are arranged in a lateral direction. Arbitrary allocated number of adjacent sub-openings among the plural sub-openings belonging to a reference parallax barrier pitch are put into a light transmittance state, and the remaining sub-openings are put into a light-shielding state, so that a general opening is formed on the parallax barrier shutter panel. A sub-opening pitch of the sub-opening on the boundary part between the adjacent common driving areas is different from the sub-opening pitch of the other sub-openings.

3 Claims, 31 Drawing Sheets

(56) References Cited

U.S. PATENT DOCUMENTS

| | | | |
|---|---|---|---|
| 2007/0183015 A1 | 8/2007 | Jacobs et al. | |
| 2009/0046142 A1 | 2/2009 | Cha et al. | |
| 2009/0190048 A1* | 7/2009 | Hong | G02B 27/2214 349/15 |
| 2010/0118045 A1 | 5/2010 | Brown Elliott et al. | |
| 2012/0162762 A1 | 6/2012 | Takahashi | |
| 2012/0268704 A1* | 10/2012 | Inoue | G02B 27/2214 349/143 |
| 2013/0021329 A1* | 1/2013 | Sakamoto | G02B 27/2214 345/419 |
| 2013/0083089 A1* | 4/2013 | Koito | H04N 13/0404 345/690 |
| 2013/0201417 A1* | 8/2013 | Murao | G02B 27/2214 349/15 |
| 2013/0293793 A1* | 11/2013 | Lu | G02B 27/2214 349/15 |
| 2014/0043573 A1* | 2/2014 | Wu | G02F 1/133707 349/123 |

FOREIGN PATENT DOCUMENTS

| | | |
|---|---|---|
| CN | 202306062 U | 7/2012 |
| CN | 102662283 A | 9/2012 |
| JP | 2857429 B | 11/1998 |
| JP | 3096613 B | 8/2000 |
| JP | 2001-166259 A | 6/2001 |
| JP | 3668116 B | 4/2005 |
| JP | 2007-293270 | 11/2007 |
| JP | 2008-089631 A | 4/2008 |
| JP | 2008-242055 A | 10/2008 |
| JP | 2013-024957 A | 2/2013 |
| WO | 2008/100826 A1 | 8/2008 |
| WO | 2013/069387 A1 | 5/2013 |

OTHER PUBLICATIONS

An Office Action; "Notification of Reason(s) for Refusal," issued by the Japanese Patent Office on May 10, 2016, which corresponds to Japanese Patent Application No. 2012-213600 and is related to U.S. Appl. No. 14/034,392; with English language partial translation.

* cited by examiner

F I G. 8
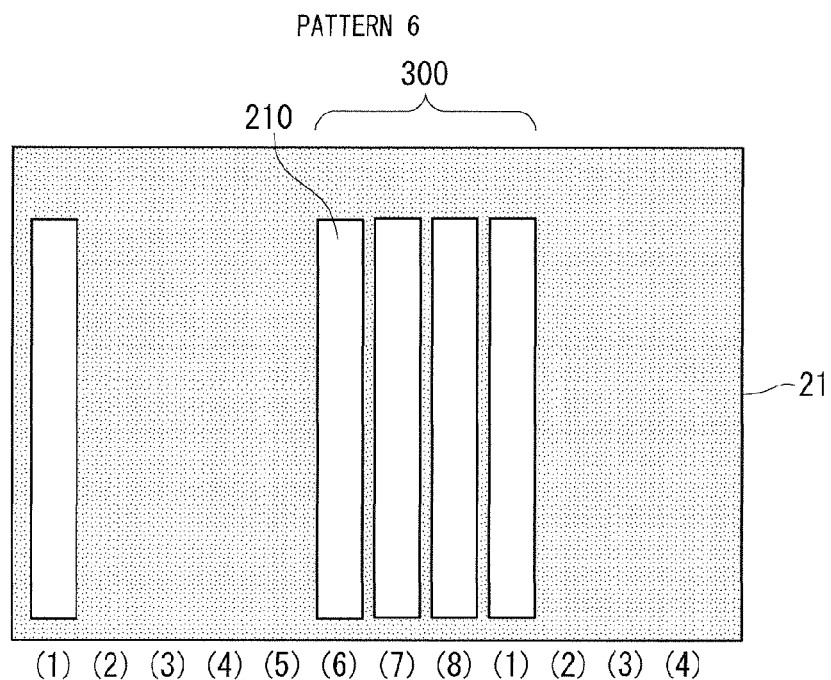
F I G. 9
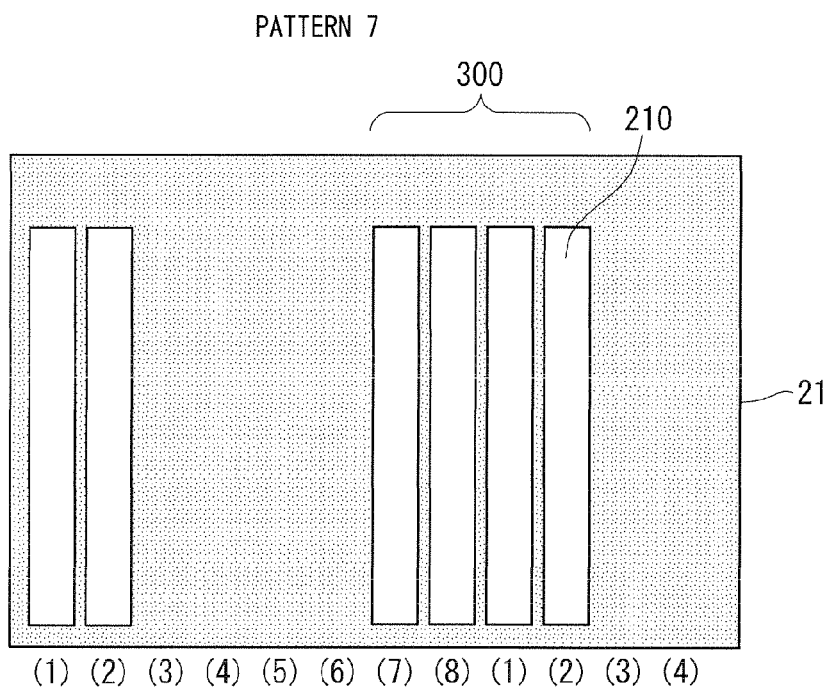

F I G . 1 2
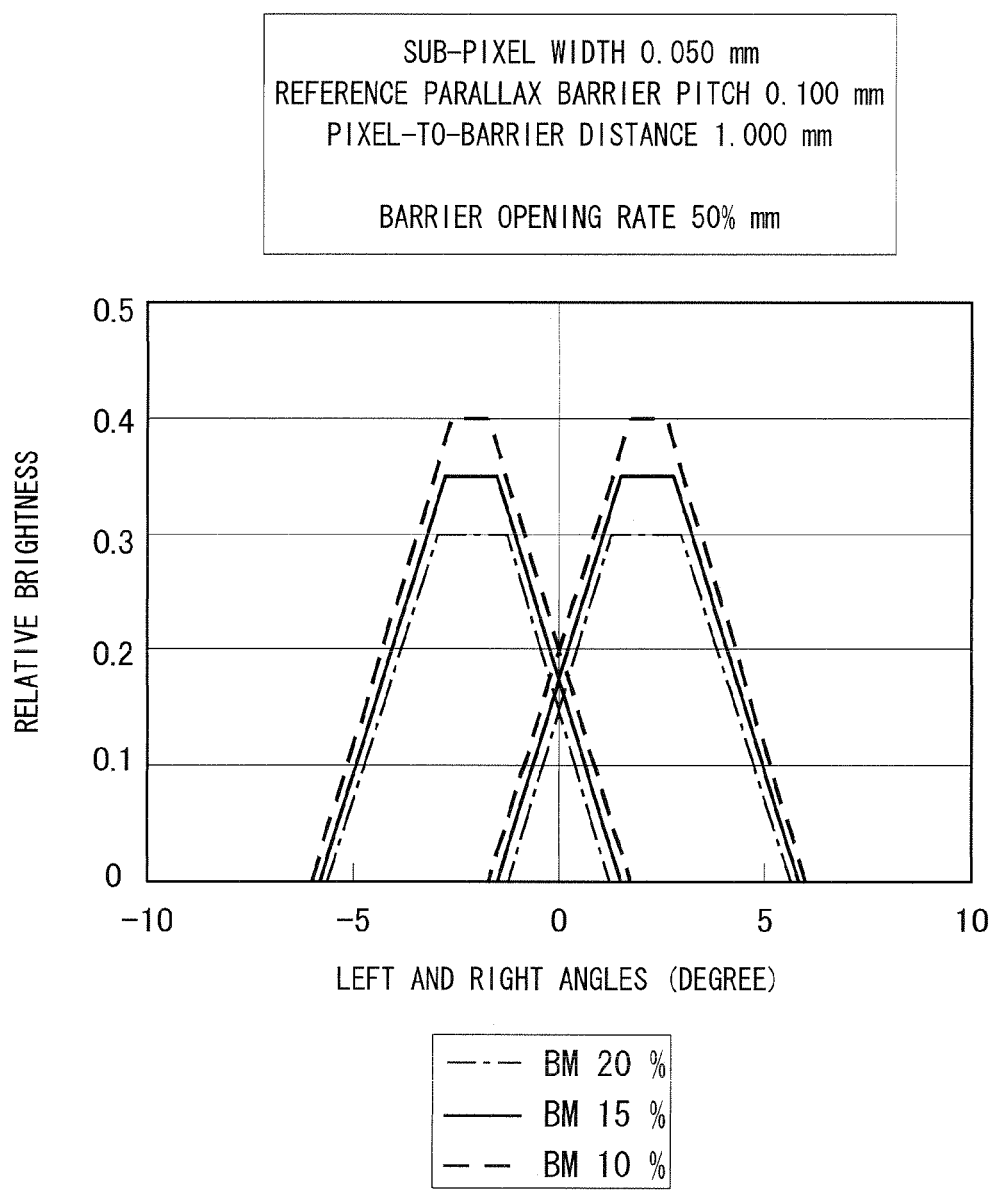

FIG. 13

| | CONDITION 1 | CONDITION 2 | CONDITION 3 | CONDITION 4 | CONDITION 5 | CONDITION 6 |
|---|---|---|---|---|---|---|
| REFERENCE PARALLAX BARRIER PITCH P (mm) | 0.100 | 0.100 | 0.100 | 0.100 | 0.100 | 0.100 |
| SUB-PIXEL WIDTH GW (mm) | 0.030 | 0.035 | 0.040 | 0.040 | 0.045 | 0.050 |
| GW/P (%) | 30% | 35% | 40% | 40% | 45% | 50% |
| GENERAL OPENING WIDTH SW (mm) | 0.050 | 0.050 | 0.050 | 0.020 | 0.025 | 0.030 |
| SW/P (%) | 50% | 50% | 50% | 20% | 25% | 30% |
| DIFFERENCE IN WIDTHS |GW − SW| (mm) | 0.020 | 0.015 | 0.010 | 0.020 | 0.020 | 0.020 |
| |GW−SW|/P (%) | 20% | 15% | 10% | 20% | 20% | 20% |
| BRIGHTNESS FLAT REGION ANGULAR WIDTH (DEGREE) | 2 | 1.5 | 1 | 2 | 2 | 2 |
| RELATIVE PEAK BRIGHTNESS | 0.030 | 0.035 | 0.040 | 0.020 | 0.025 | 0.030 |
| GENERAL LIGHT-SHIELDING UNIT WIDTH SBW (mm) | 0.050 | 0.050 | 0.050 | 0.080 | 0.075 | 0.070 |
| SBW/P (%) | 50% | 50% | 50% | 80% | 75% | 70% |
| DIFFERENCE IN WIDTHS |GW − SBW| (mm) | 0.020 | 0.015 | 0.010 | 0.040 | 0.030 | 0.020 |
| |GW−SBW|/P (%) | 20% | 15% | 10% | 40% | 30% | 20% |
| COMPLETE LIGHT-SHIELDING ANGULAR WIDTH (DEGREE) | 2 | 1.5 | 1 | 4 | 3 | 2 |

F I G . 1 5
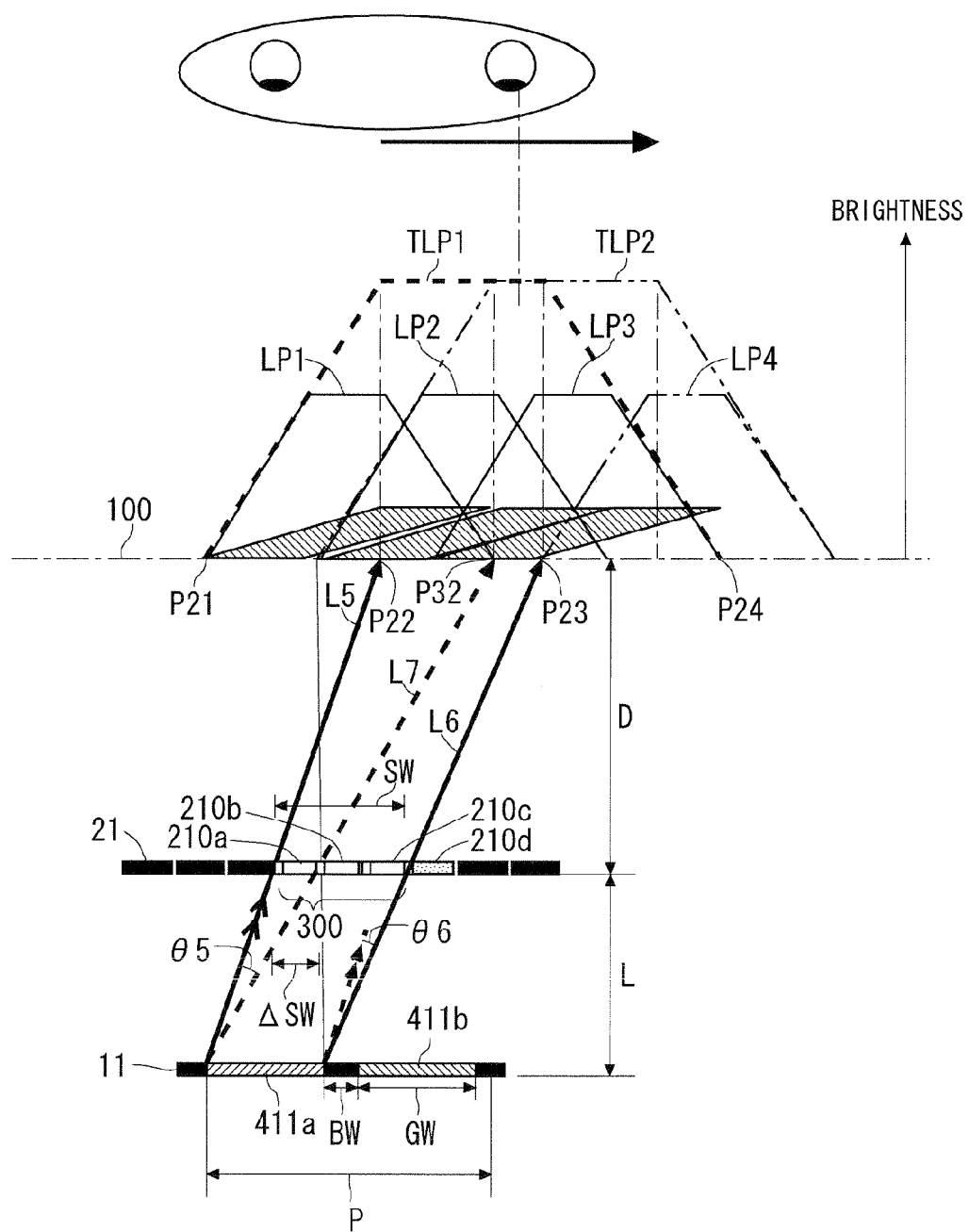

F I G . 1 7
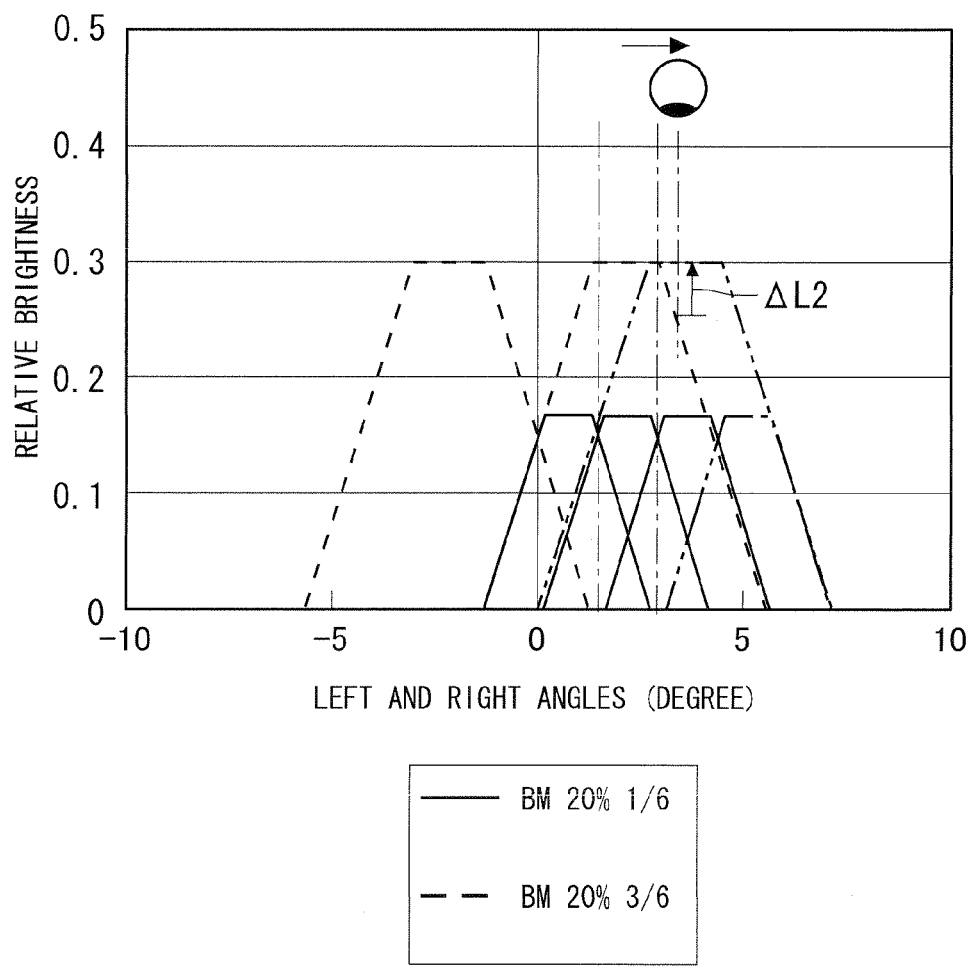

F I G. 19

| | CONDITION 1-1 | CONDITION 1-2 | CONDITION 1-3 | CONDITION 3-1 | CONDITION 3-2 | CONDITION 3-3 |
|---|---|---|---|---|---|---|
| REFERENCE PARALLAX BARRIER PITCH P (mm) | 0.100 | 0.100 | 0.100 | 0.100 | 0.100 | 0.100 |
| SUB-PIXEL WIDTH GW (mm) | 0.030 | 0.030 | 0.030 | 0.040 | 0.040 | 0.040 |
| GW/P (%) | 30% | 30% | 30% | 40% | 40% | 40% |
| GENERAL OPENING WIDTH SW (mm) | 0.050 | 0.050 | 0.050 | 0.0550 | 0.050 | 0.050 |
| SW/P (%) | 50% | 50% | 50% | 50% | 50% | 50% |
| DIFFERENCE IN WIDTHS \|GW − SW\| (mm) | 0.020 | 0.020 | 0.020 | 0.010 | 0.010 | 0.010 |
| \|GW−SW\|/P (%) | 20% | 20% | 20% | 10% | 10% | 10% |
| DIVISION NUMBER OF BARRIER N | 4 | 6 | 8 | 6 | 8 | 10 |
| SUB-OPENING PITCH ΔSW (mm) | 0.025 | 0.017 | 0.0125 | 0.017 | 0.0125 | 0.0100 |
| ΔSW/P (%) | 25% | 17% | 12.5% | 17% | 12.5% | 10% |
| EXISTENCE OR NON-EXSISTENCE OF OVERLAPPED FLAT PORTION | × | ○ | ◎ | × | × | ○ |

FIG. 20

| | | CONDITION 7-1 | CONDITION 7-2 | CONDITION 7-3 | CONDITION 7-4 | CONDITION 7-5 | CONDITION 7-6 | CONDITION 7-7 |
|---|---|---|---|---|---|---|---|---|
| | REFERENCE PARALLAX BARRIER PITCH P (mm) | 0.100 | 0.100 | 0.100 | 0.100 | 0.100 | 0.100 | 0.100 |
| DESIGN OF DISTRIBUTION OF BRIGHTNESS ANGLE | SUB-PIXEL WIDTH GW (mm) | 0.025 | 0.033 | 0.037 | 0.040 | 0.043 | 0.044 | 0.045 |
| | GW/P (%) | 25% | 33% | 37% | 40% | 43% | 44% | 45% |
| | GENERAL OPENING WIDTH SW (mm) | 0.05 | 0.05 | 0.05 | 0.05 | 0.05 | 0.05 | 0.05 |
| | SW/P (%) | 50% | 50% | 50% | 50% | 50% | 50% | 50% |
| | RELATIVE PEAK BRIGHTNESS | 25% | 33% | 38% | 40% | 43% | 44% | 45% |
| | DIFFERENCE IN WIDTHS \|GW − SW\| (mm) | 0.025 | 0.017 | 0.013 | 0.010 | 0.007 | 0.006 | 0.005 |
| | \|GW−SW\|/P | 25.0% | 16.7% | 12.5% | 10.0% | 7.1% | 5.6% | 5.0% |
| DESIGN OF DIVISION OF PARALLAX BARRIER | DIVISION NUMBER OF BARRIER N | 4 | 6 | 8 | 10 | 14 | 18 | 20 |
| | SUB-OPENING PITCH ΔSW (mm) | 0.025 | 0.017 | 0.013 | 0.010 | 0.007 | 0.006 | 0.005 |
| | ΔSW/P | 25.0% | 16.7% | 12.5% | 10.0% | 7.1% | 5.6% | 5.0% |
| | EXISTENCE OR NON-EXSISTENCE OF OVERLAPPED FLAT PORTION | ○ | ○ | ○ | ○ | ○ | ○ | ○ |
| | TOTAL NUMBER OF BOUNDARIES IN BARRIER GENERAL OPENING | 1 | 2 | 3 | 4 | 6 | 8 | 9 |
| | ·IN GENERAL OPENING AREA RATIO OF LIGHT-SHIELDING PORTION ON BOUNDARY ·WIDTH OF LIGHT-SHIELDING PORTION ON BOUNDARY 0.002 mm | 4% | 8% | 12% | 16% | 24% | 32% | 36% |
| | GENERAL RELATIVE PEAK BRIGHTNESS (TO BRIGHTNESS OF LIGHT-EMITTING UNIT OF PIXEL) | 24.0% | 30.7% | 33.0% | 33.6% | 32.6% | 30.2% | 28.8% |

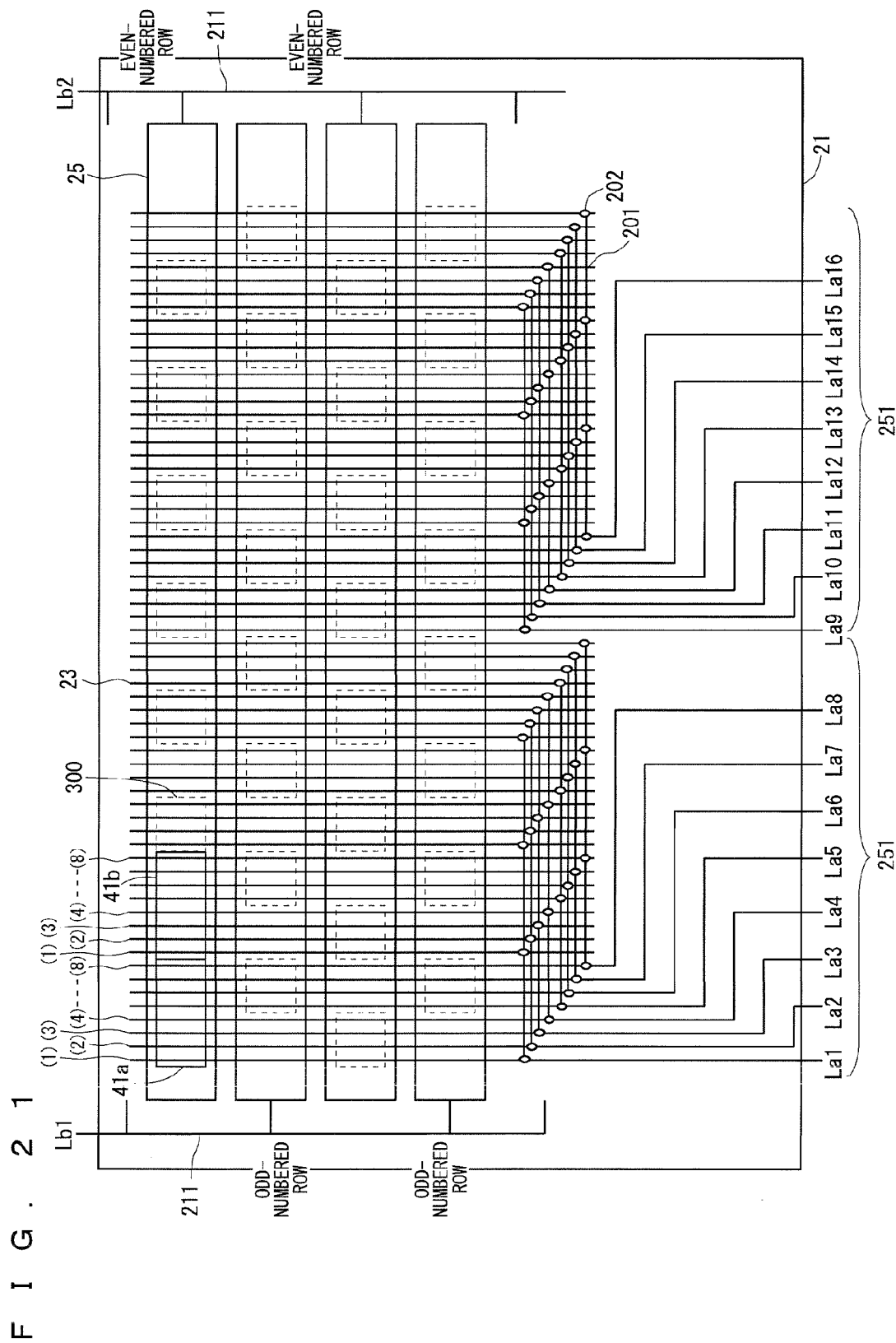

F I G . 2 2

| | Voltage Pattern No | Vertical Wiring First Substrate First Transparent Electrode | | | | | | | | Vertical Wiring Second Substrate Second Transparent Electrode | Transmittance ○/Light-Shielding × | | | | | | | |
|---|---|---|---|---|---|---|---|---|---|---|---|---|---|---|---|---|---|---|
| | | La1 | La2 | La3 | La4 | La5 | La6 | La7 | La8 | | (1) | (2) | (3) | (4) | (5) | (6) | (7) | (8) |
| Odd-numbered Row Lb1 | 1 | + | + | + | + | 0 | 0 | 0 | 0 | 0 | ○ | ○ | ○ | ○ | × | × | × | × |
| | 2 | 0 | + | + | + | + | 0 | 0 | 0 | 0 | × | ○ | ○ | ○ | ○ | × | × | × |
| | 3 | 0 | 0 | + | + | + | + | 0 | 0 | 0 | × | × | ○ | ○ | ○ | ○ | × | × |
| | 4 | 0 | 0 | 0 | + | + | + | + | 0 | 0 | × | × | × | ○ | ○ | ○ | ○ | × |
| | 5 | 0 | 0 | 0 | 0 | + | + | + | + | 0 | × | × | × | × | ○ | ○ | ○ | ○ |
| | 6 | + | 0 | 0 | 0 | 0 | + | + | + | 0 | ○ | × | × | × | × | ○ | ○ | ○ |
| | 7 | + | + | 0 | 0 | 0 | 0 | + | + | 0 | ○ | ○ | × | × | × | × | ○ | ○ |
| | 8 | + | + | + | 0 | 0 | 0 | 0 | + | 0 | ○ | ○ | ○ | × | × | × | × | ○ |
| Even-numbered Row Lb2 | 1 | + | + | + | + | 0 | 0 | 0 | 0 | + | × | × | × | × | ○ | ○ | ○ | ○ |
| | 2 | 0 | + | + | + | + | 0 | 0 | 0 | + | ○ | × | × | × | × | ○ | ○ | ○ |
| | 3 | 0 | 0 | + | + | + | + | 0 | 0 | + | ○ | ○ | × | × | × | × | ○ | ○ |
| | 4 | 0 | 0 | 0 | + | + | + | + | 0 | + | ○ | ○ | ○ | × | × | × | × | ○ |
| | 5 | 0 | 0 | 0 | 0 | + | + | + | + | + | ○ | ○ | ○ | ○ | × | × | × | × |
| | 6 | + | 0 | 0 | 0 | 0 | + | + | + | + | × | ○ | ○ | ○ | ○ | × | × | × |
| | 7 | + | + | 0 | 0 | 0 | 0 | + | + | + | × | × | ○ | ○ | ○ | ○ | × | × |
| | 8 | + | + | + | 0 | 0 | 0 | 0 | + | + | × | × | × | ○ | ○ | ○ | ○ | × |

FIG. 29

| OBSERVATION DISTANCE | HORIZONTAL POSITION OF OBSERVER | LEFT-3 COMMON DRIVING AREA | LEFT-2 COMMON DRIVING AREA | LEFT-1 COMMON DRIVING AREA | CENTRAL COMMON DRIVING AREA | RIGHT-1 COMMON DRIVING AREA | RIGHT-2 COMMON DRIVING AREA | RIGHT-3 COMMON DRIVING AREA |
|---|---|---|---|---|---|---|---|---|
| FAR CASE | FRONT | PATTERN 2 | PATTERN 2 | PATTERN 3 | PATTERN 3 | PATTERN 4 | PATTERN 4 | PATTERN 5 |
| DESIGNED DISTANCE (INTERMEDIATE) | FRONT | PATTERN 3 | PATTERN 3 | PATTERN 3 | PATTERN 3 | PATTERN 3 | PATTERN 3 | PATTERN 3 |
| | LEFT DIRECTION | PATTERN 2 | PATTERN 2 | PATTERN 2 | PATTERN 2 | PATTERN 2 | PATTERN 2 | PATTERN 2 |
| NEAR CASE | FRONT | PATTERN 5 | PATTERN 4 | PATTERN 4 | PATTERN 3 | PATTERN 3 | PATTERN 2 | PATTERN 2 |

F I G. 3 0
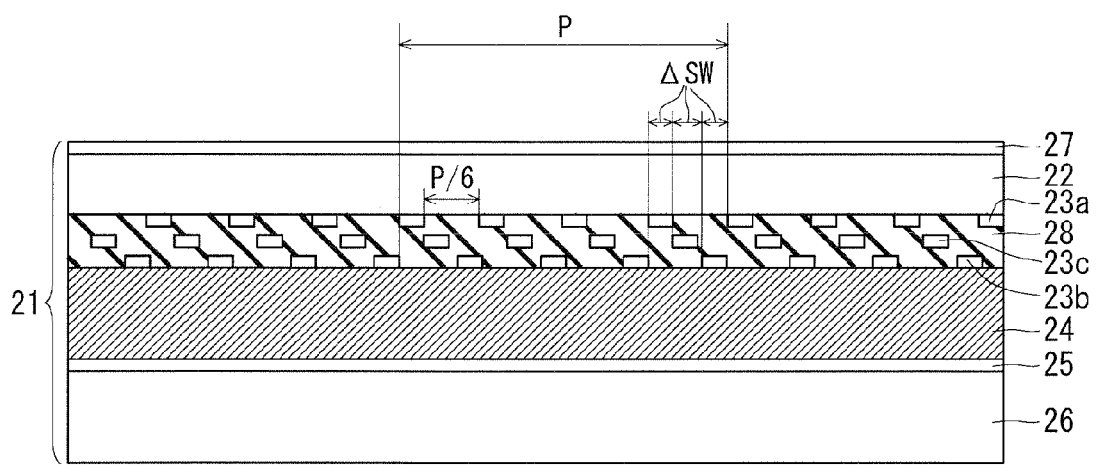

ARRANGEMENT OF
SUB-PIXELS ON PANEL

VERTICAL STRIPE
ARRANGEMENT OF OPENING

CHECKERED FLAG PATTERN ARRANGEMENT OF OPENING

IMAGE IN FIRST DIRECTION
+ VERTICAL STRIPE
ARRANGEMENT OF OPENING

IMAGE IN SECOND DIRECTION
+ VERTICAL STRIPE
ARRANGEMENT OF OPENING

ARRANGEMENT OF
SUB-PIXELS ON PANEL

ARRANGEMENT OF
SUB-PIXELS ON PANEL

CHECKERED FLAG PATTERN
ARRANGEMENT OF OPENING

VERTICAL STRIPE
ARRANGEMENT OF OPENING

IMAGE IN FIRST DIRECTION
+ VERTICAL STRIPE
ARRANGEMENT OF OPENING

IMAGE IN SECOND DIRECTION
+ VERTICAL STRIPE
ARRANGEMENT OF OPENING

ARRANGEMENT OF
SUB-PIXELS ON PANEL

FIG. 35A
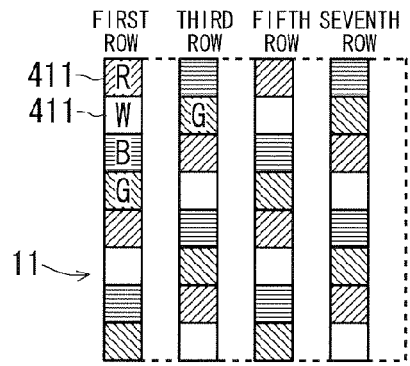
IMAGE IN FIRST DIRECTION
+ VERTICAL STRIPE
ARRANGEMENT OF OPENING
FIG. 35B
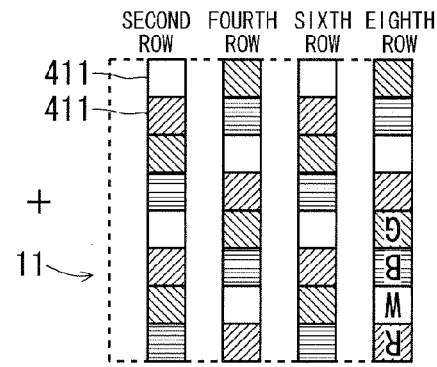
IMAGE IN SECOND DIRECTION
+ VERTICAL STRIPE
ARRANGEMENT OF OPENING
FIG. 35C
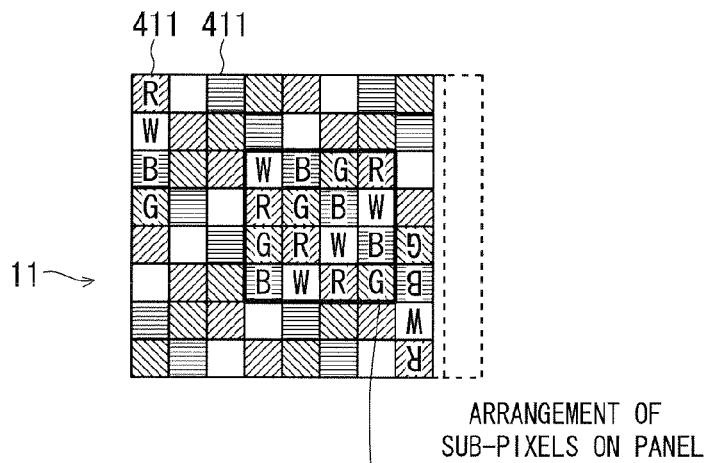
ARRANGEMENT OF
SUB-PIXELS ON PANEL
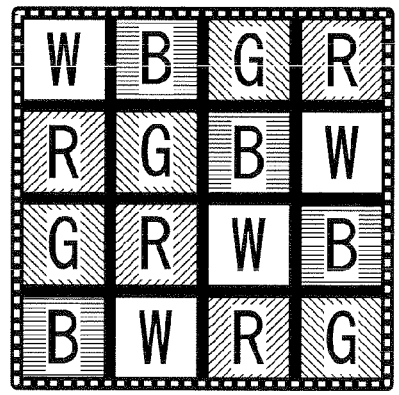

DISPLAY DEVICE

BACKGROUND OF THE INVENTION

1. Field of the Invention

The present invention relates to a display device that can simultaneously display two images, and more particularly to a display device that can realize glasses-free 3D display or display two different images in each observation direction by using an optical deflecting member such as parallax barrier or a lenticular lens.

2. Description of the Background Art

In recent years, a glasses-free 3D image display that can display a 3D image without a need of special glasses has been proposed.

For example, Japanese Patent No. 2857429 describes a 3D image display device including barrier generating means that generates a parallax barrier stripe by an electric control of a transmissive display element, a display screen arranged posteriorly to the generation position of the parallax barrier stripe with a predetermined distance, and image display means that can output and display a multi-direction image in which a strip for a left image and a strip for a right image are alternately arranged corresponding to the parallax barrier stripe onto the display screen during the display of a 3D image.

In the 3D image display device described above, the barrier stripe is electrically generated, and the shape (the number, width, and space of stripes), position (phase), and density of such barrier stripe can be variable controlled freely. Therefore, this display device can be used as not only the 3D display device and its display method but also a 2D image display device and its display method, whereby this patent describes that a compatible image display device and image display method can be realized.

Japanese Patent No. 3668116 describes a 3D video image display device including image display means that alternately displays a stripe-like left-eye image and a stripe-like right-eye image, light-shielding means that is configured to be capable of moving a light-shielding unit, which generates a binocular parallax effect, with a pitch of ¼ of the pitch of the light-shielding unit, a sensor that detects a motion of a head of an observer in a horizontal direction and detects whether the position of the head of the observer is outside an effective zone in the front-back direction, and divided area movement control means. This patent describes that the divided area movement control means controls to allow the light-shielding unit of the light-shielding means to move or not to move for each divided area according to the state where the position of the observer's head is outside the effective zone in the front-back direction.

In the 3D image display device described in Japanese Patent No. 3668116, when the head of the observer moves to the shifted position, the movement of the light-shielding unit is controlled, and the display of the image display means is controlled, whereby a right-eye image can be fed to the right eye of the observer. Since a left-eye image can be fed to the left eye of the observer in this case, the observer can recognize a 3D video image.

Japanese PCT National Publication No. 2011-505017 describes a directional display device (3D image display device) including a display panel that includes a sub-pixel repetitive group containing eight sub-pixels including a first main-color sub-pixel, a second main-color sub-pixel, a third main-color sub-pixel, and a fourth main-color sub-pixel, and arranged in 4×2 matrix, the eight sub-pixels including the first main-color sub-pixel, the second main-color sub-pixel, the third main-color sub-pixel, and the fourth main-color sub-pixel in each row; a driving circuit that transmits a signal to each sub-pixel on the display panel; and an optical induction member that guides light emitted from a first group (sub-pixel group for right-eye image) of the sub-pixels on the display panel to a first visual field window (in the direction of a right eye), and guides light emitted from a second group (sub-pixel group for left-eye image) of the sub-pixels on the display panel to a second visual field window (in the direction of a left eye).

It is described that the 3D image display device in Japanese PCT National Publication No. 2011-505017 can provide an image having correct color information even as a single right-eye image and as a single left-eye image.

Japanese Patent No. 3096613 describes a 3D display device including a video image display panel in which right-eye pixels displaying a right-eye video image and left-eye pixels displaying a left-eye image are alternately arranged on all lines and all rows (checkered flag pattern); and an optical filter (parallax barrier or lens) that is arranged to the side close to an observer, of the video image display panel, has openings corresponding to the right-eye pixel and the left-eye pixel, and separates light from the right-eye pixel and light from the left-eye pixel to output the resultant to the observer.

According to the 3D display device described in Japanese Patent No. 3096613, the left eye and the right eye respectively observe a video image equivalent to a video image displayed onto a liquid crystal panel having a horizontal pixel pitch equal to the horizontal pixel pitch of the used liquid crystal panel. Accordingly, the number of the pixel rows in the horizontal direction is not decreased, so that the observer does not feel the presence of vertical stripes as in the conventional case.

However, in the 3D display device described in Japanese Patent No. 2857429 and Japanese Patent No. 3668116, the observer feels brightness variation during the electric control of moving the barrier light-shielding unit and the display control of the image display means according to the motion of the observer's head. The observer especially feels uncomfortable when the observer's head moves greatly, and the changeover is frequently made. There is a problem that the brightness variation is noticeable on the boundary where the parallax direction is changed.

In the glasses-free 3D display or in the two-image display that displays different images for each observation direction, using the optical polarizing member of a vertical stripe shape, such as a parallax barrier or lenticular lens, and a display panel, as described in Japanese Patent No. 2857429 and Japanese Patent No. 3668116, the resolution of the image in the horizontal direction viewed from one observation direction is reduced to ½. Similarly, in the 3D image display device described in Japanese PCT National Publication No. 2011-505017, the resolution of the image in the horizontal direction viewed from one observation direction is reduced to ½.

As a countermeasure, the structure described in Japanese Patent No. 3096613 is considered, the structure including a video image display panel in which right-eye pixels displaying a right-eye video image and left-eye pixels displaying a left-eye image are alternately arranged on all lines and all rows; and an optical filter (parallax barrier lens) that is arranged to the side close to an observer, of the video image display panel, has openings corresponding to the right-eye pixel and the left-eye pixel and separates light from the right-eye pixel and light from the left-eye pixel to output the resultant to the observer. However, according to this structure, the visible angular range in the vertical direction is narrowed, and the brightness efficiency is deteriorated, compared to the case where the optical filter (parallax barrier or lens) having vertical-stripe openings is used. This structure also needs not only the positioning in the horizontal direction and matching in angle but also the positioning in the vertical direction, when the optical filter and the video image display panel are assembled. This makes the assembling work difficult.

SUMMARY OF THE INVENTION

An object of the present invention is to provide a two-image display that can appropriately display two images.

The present invention is a display device that can simultaneously display two images, and includes a display panel, and a parallax barrier shutter panel. The display panel has a sub-pixel pair including two sub-pixels for displaying each of two images, and the sub-pixel pair is arranged in a lateral direction. The parallax barrier shutter panel is arranged anteriorly to or posteriorly to the display panel, and is formed with sub-openings that are arranged in a lateral direction and that can be changed between a light transmittance state and a light-shielding state according to an electric control. The adjacent plural sub-openings on the parallax barrier shutter panel are put into the light transmittance state and the other sub-openings are put into the light-shielding state, within a region of a reference pitch corresponding to each sub-pixel pair on the display panel, so that a general opening is formed. The parallax barrier shutter panel includes two transparent substrates, a liquid crystal layer held between two transparent substrates, and plural first transparent electrodes. The plural first transparent electrodes are formed on a surface close to the liquid crystal layer, of one of two transparent substrates, and extend in the longitudinal direction. A display area of the liquid crystal barrier shutter panel is divided into plural common driving areas in the lateral direction. With respect to one common driving area, each of the plural first transparent electrodes corresponding to the sub-pixel pair and each of the plural first transparent electrodes corresponding to the other sub-pixel pair are electrically connected in correspondence with the position of the sub-openings. The pitch of the sub-openings on the boundary part between the adjacent common driving areas is different from the pitch of the other sub-openings.

The present invention can reduce the brightness variation on the boundary part between the common driving areas.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 to FIG. 10 are views illustrating a general opening according to the first preferred embodiment;

FIG. 12 is a graph illustrating a calculation result of the configuration of the display device;

FIG. 13 is a table illustrating a calculation result to the configuration of the display device;

FIG. 15 is a view for describing the configuration of the display device according to the first preferred embodiment;

FIG. 16 to FIG. 18 are graphs illustrating a calculation result of the configuration of the display device;

FIG. 19 and FIG. 20 are tables illustrating a calculation result to the configuration of the display device;

FIG. 21 is a plan view illustrating a configuration of a display device according to a second preferred embodiment;

FIG. 22 to FIG. 26 are views illustrating an operation of the display device according to the second preferred embodiment;

FIG. 28 and FIG. 29 are views illustrating an operation of the display device according to the third preferred embodiment;

FIG. 30 is a sectional view illustrating a configuration of a parallax barrier shutter panel in a display device according to a fourth preferred embodiment;

FIGS. 35A, 35B and 35C are plan views illustrating an arrangement of sub-pixels on another display panel of the display device according to the fifth preferred embodiment.

DESCRIPTION OF THE PREFERRED EMBODIMENTS

<First Preferred Embodiment>

Figure 1:
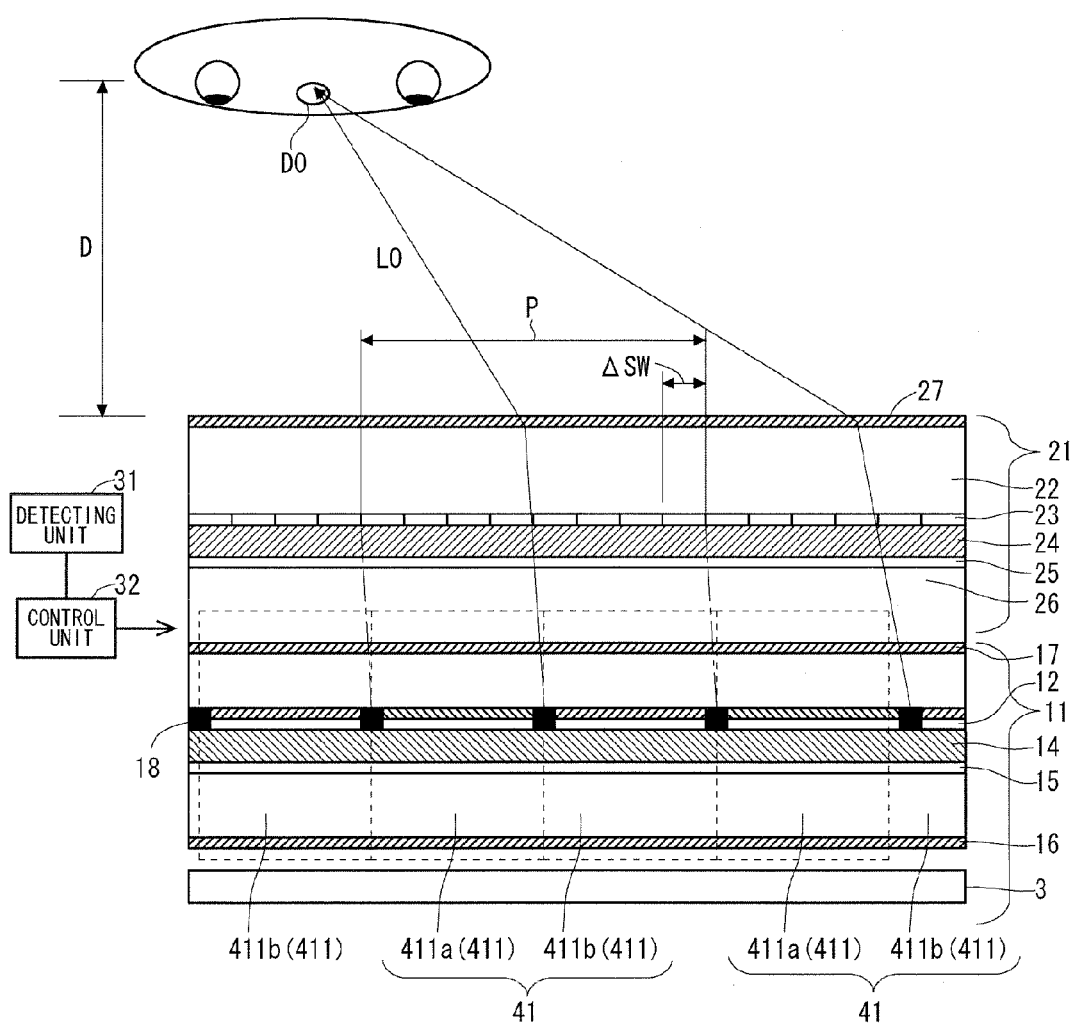
FIG. 1 is a sectional view illustrating a configuration of a display device according to a first preferred embodiment.

FIG. 1 is a sectional view illustrating a configuration of a display device according to a first preferred embodiment of the present invention. The display device can simultaneously display two images, which are a right image (a parallax image for right eye, or an image for a first observation direction) and a left image (a parallax image for left eye that is slightly different from the parallax image for the right eye, or an image for a second observation direction). With this display device, a user can visually confirm a 3D image with the naked eye without using special glasses. Alternatively, the display device can display different images for each observation direction. The case where the display device displays a parallax image for the right eye and a parallax image for the left eye will mainly be described below.

This display device includes a glasses-free 3D display described later, a detecting unit 31 that detects a position (motion) of a head of an observer, and a control unit 32 that integrally controls these, based upon a detection result of the detecting unit 31 or a video signal. In the description below, a vertical direction in FIG. 1 is referred to as a front-back direction, a horizontal direction in FIG. 1 is referred to as a lateral direction, and a depth direction in FIG. 1 is referred to as a longitudinal direction.

FIG. 1 illustrates a cross-sectional structure of the glasses-free 3D display. As illustrated in FIG. 1, the glasses-free 3D display includes a display panel 11, and a parallax barrier shutter panel 21 (optical induction member) arranged in front of the display panel 11 (above the display panel 11 in FIG. 1).

The display panel 11 is a matrix display panel. For example, an organic EL panel, a plasma display, and a liquid crystal display are employed for the display panel 11. When the liquid crystal display is employed for the display panel 11, the parallax barrier shutter panel 21 is arranged posteriorly to the display panel 11, although this structure is not illustrated. FIG. 1 illustrates the display panel 11 using the liquid crystal display. The display panel 11 includes a liquid crystal 14, a sub-pixel transparent electrode 12 and a counter transparent electrode 15 that are driven across the liquid crystal 14, an intermediate polarizing plate 17 and a back polarizing plate 16 provided respectively on a transparent substrate of the sub-pixel transparent electrode 12 and a transparent substrate of the counter transparent electrode 15, and a backlight 3 arranged posteriorly to the back polarizing plate 16 (below the back polarizing plate 16 in FIG. 1).

On the display panel 11, sub-pixels 411a (411) displaying the right image and sub-pixels 411b (411) displaying the left image are alternately arranged in the lateral direction, the sub-pixel 411a and the sub-pixel 411b being arranged between light-shielding walls 18 respectively.

The width of the sub-pixel 411a and the width of the sub-pixel 411b are the same or almost the same. The adjacent sub-pixel 411a and the sub-pixel 411b form a sub-pixel pair 41 for displaying two different images which are left image and right image (left and right parallax images, or images for first and second observation directions). The sub-pixel pairs 41 described above are arranged on the display panel 11 in the lateral direction with a prescribed uniform pitch. In the present preferred embodiment, the sub-pixel pairs 41 are arranged not only in the lateral direction but also in the longitudinal direction.

In the present preferred embodiment, a reference parallax barrier pitch P, which is a lateral reference pitch corresponding to the width of the sub-pixel pair 41, is specified. In the present preferred embodiment, the reference parallax barrier pitch P is set such that virtual ray LO that is emitted from the center of the light-shielding wall 18 present on the middle of the sub-pixels 411a and 411b forming the sub-pixel pair 41, and that passes through a center point in the corresponding reference parallax barrier pitch P, is collected on a designed visual point DO apart by a designed observation distance D anteriorly from the front of the glasses-free 3D display.

The parallax barrier shutter panel 21 includes two transparent electrodes (first transparent substrate 22 and a second transparent substrate 26), a liquid crystal layer 24 held between these electrodes, first and second transparent electrodes 23 and 25, a display-surface polarizing plate 27 provided on the surface of the first transparent electrode 22 reverse to the liquid crystal layer 24, and a polarizing plate provided on the surface close to the display panel 11, of the second transparent substrate 26. The intermediate polarizing plate 17 in the display panel 11 is also used as the polarizing plate.

Usable liquid crystal modes include twisted nematic (TN), super-twisted nematic (STN), in plane switching, and optically compensated bend (OCB). A preferred embodiment using some of these modes will be described later.

Plural first transparent electrodes 23 extending in the longitudinal direction (in the depth direction in FIG. 1) are provided on the surface near the liquid crystal layer 24, of the first transparent substrate 22, and plural second transparent electrodes 25 extending in the lateral direction (in the horizontal direction in FIG. 1) are provided on the surface near the liquid crystal layer 24, of the second transparent substrate 26. These plural first transparent electrodes 23 and the second transparent electrodes 25 apply an electric field to the liquid crystal layer 24 for driving liquid crystal in the liquid crystal layer 24.

Each of the first transparent electrodes 23 corresponds to each of electrodes formed by dividing one transparent electrode in an even number (here, eight) within a region of the reference parallax barrier pitch P. Specifically, in the present preferred embodiment, the number of the plural first transparent electrodes 23 within the region of the reference parallax barrier pitch P of each sub-pixel pair 41 in the lateral direction is an even number (here, eight). Unless otherwise specified, the plural first transparent electrodes 23 are electrically insulated from one another.

On the other hand, the plural second transparent electrodes 25 are arranged in the longitudinal direction (in the depth direction in FIG. 1) with the longitudinal pitch of the sub-pixel pairs 41.

Voltage is selectively applied to the plural first and second transparent electrodes 23 and 25. Accordingly, a light transmittance state and a light shielding state of the parallax barrier shutter panel 21 can be switched with a unit of the width of the first and second transparent electrodes 23 and 25. In the description below, an optical opening on the parallax barrier shutter panel 21 that can make changeover between the light transmittance state and the light shielding state with a unit of the horizontal width of the first transparent electrode 23 under the electric control is referred to as a sub-opening 210.

In the present preferred embodiment, the plural first transparent electrodes 23 are arranged on the parallax barrier shutter panel 21 in the lateral direction as described above, so that the plural sub-openings 210 are formed on the parallax barrier shutter panel 21 in the lateral direction. Since an even number (here, eight) of first transparent electrodes 23 are arranged on the parallax barrier shutter panel 21 within the region of the reference parallax barrier pitch P as described above, an even number (here, eight), which are the same as the even number of the first transparent electrodes, of the sub-openings 210 are included within the reference parallax barrier pitch P on the parallax barrier shutter panel 21.

Figure 2:
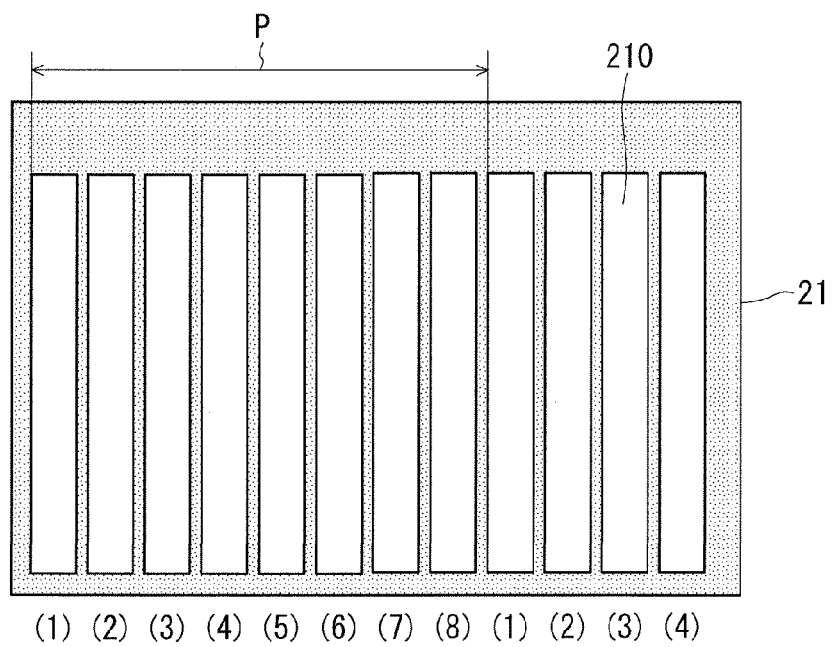
FIG. 2 is a view illustrating a parallax barrier shutter panel according to the first preferred embodiment.

FIGS. 2 to 10 are views illustrating the parallax barrier shutter panel 21. In the present preferred embodiment, as described above, it is supposed that eight first transparent electrodes 23 correspond to each of the sub-pixel pairs 41, and eight sub-openings 210 designated by (1) to (8) are included within the region of the reference parallax barrier pitch P as illustrated in FIG. 2. As illustrated in FIGS. 3 to 10, the numbers (four) of a half of the even number of the adjacent sub-openings 210 are brought into the light transmittance state, while the remaining half (four) of the sub-openings 210 (other sub-openings 210) are brought into the light shielding state within the region of each reference parallax barrier pitch P. With this, a general opening 300 is formed on the parallax barrier shutter panel 21. The general opening 300 (sub-openings 210) guides light emitted from the sub-pixel 411b displaying the left image and light emitted from the sub-pixel 411a displaying the right image in different directions.

Figure 3:
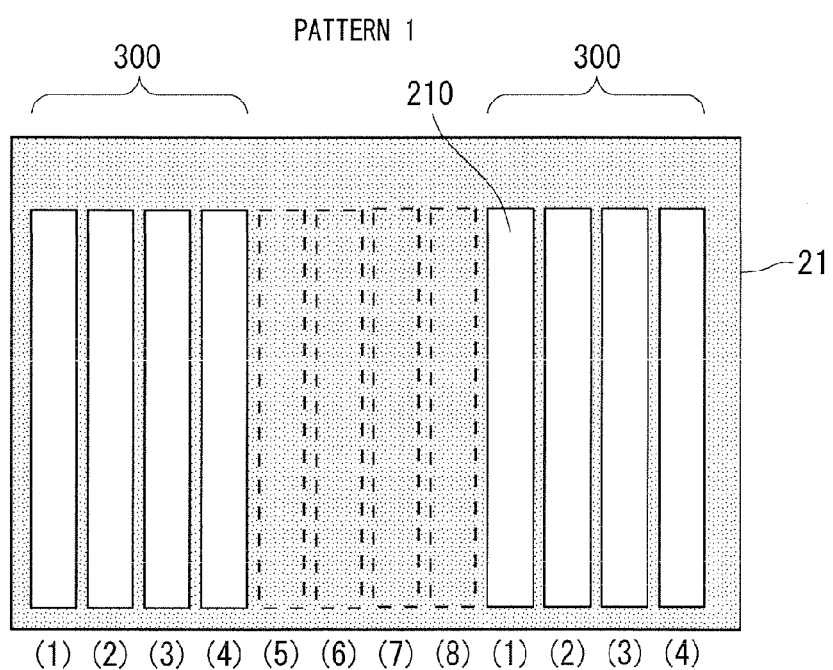
Figure 4:
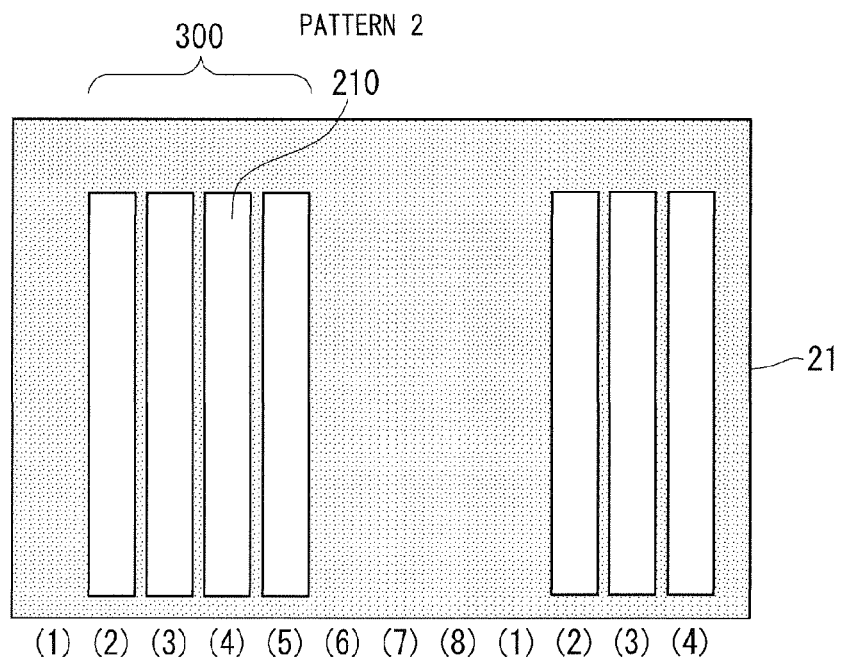
Figure 5:
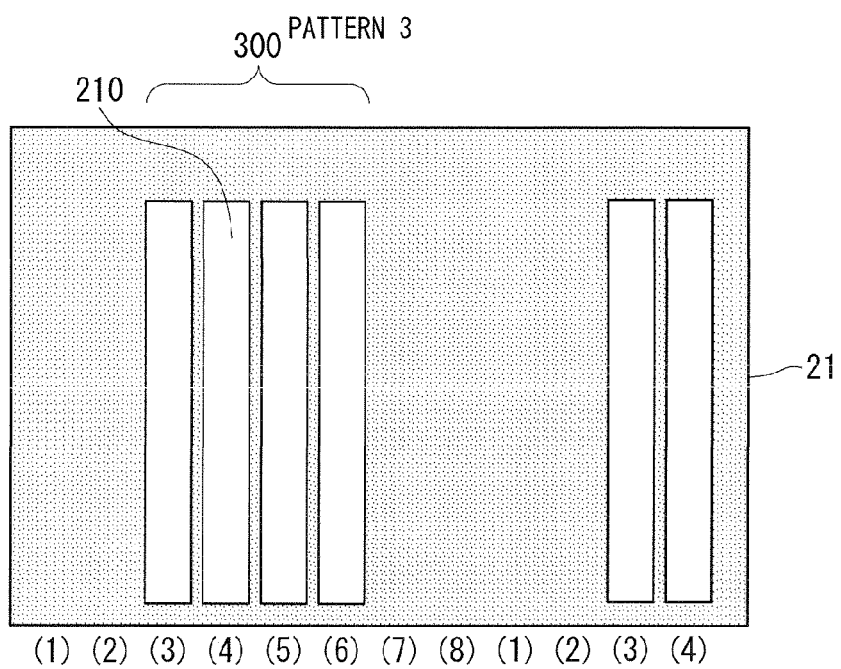
Figure 6:
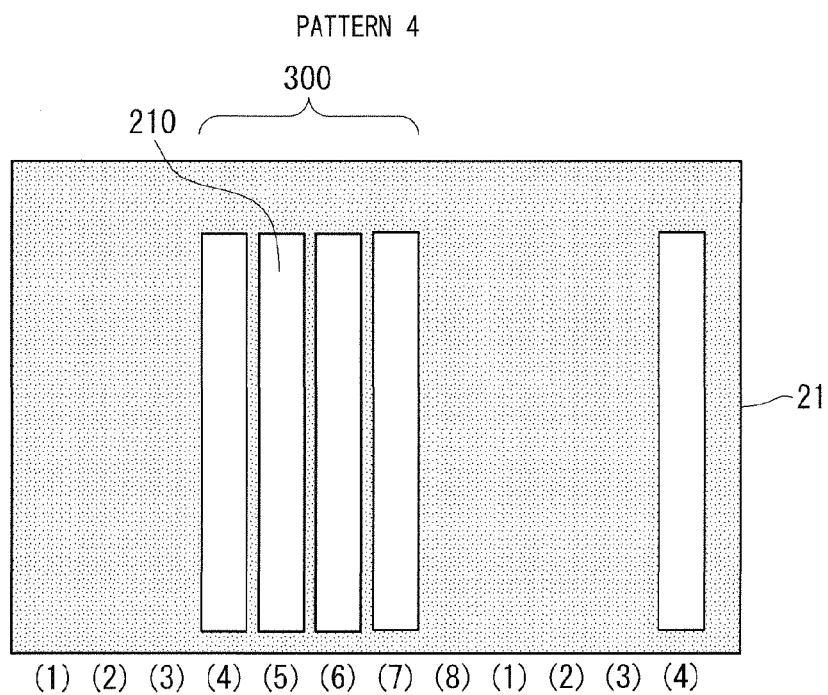

In a pattern 1 illustrated in FIG. 3, four continuous sub-openings 210 designated by (1) to (4) are put into the light transmittance state, while the sub-openings 210 designated by (5) to (8) (the other sub-openings 210) are put into the light shielding state within the region of the reference parallax barrier pitch P. In this pattern, one general opening 300 is formed by four sub-openings 210 that are in the light transmittance state.

When the sub-opening 210 designated by (1) is put into the light shielding state, while the sub-opening 210 designated by (5) is put into the light transmittance state in the pattern 1, a pattern same as a pattern 2 is created.

When the pattern is changed from the pattern 1 to the pattern 2 as described above, the general opening 300 moves to the right on the parallax barrier shutter panel 21 by the pitch of the sub-opening 210 (hereinafter referred to as a sub-opening pitch ΔSW). In other words, when the sub-opening 210 on one end of the general opening 300 is put into the light shielding state, and the sub-opening 210 adjacent to the other end of the general opening 300 is put into the light transmittance state, the general opening 300 can be moved in the direction from one end toward the other end with the sub-opening pitch ΔSW.

As described later, the first transparent electrodes 23 are slightly apart from each other. Therefore, a boundary portion where the electric field cannot be applied to the liquid crystal layer 24 is present between the first transparent electrodes. Accordingly, strictly speaking, the sub-opening pitch ΔSW=horizontal width of the sub-opening+horizontal width of boundary portion.

The operation of the display device according to the present preferred embodiment described above will briefly be described below. As described above, the detecting unit 31 in FIG. 1 detects a position (motion) of an observer. The control unit 32 controls the display panel 11 and the parallax barrier shutter panel 21 in integrated manner, based upon the detection result of the detecting unit 31. Specifically, the control unit 32 changes the sub-openings 210 that are to be put into the light transmittance state, based upon the detection result of the detecting unit 31, thereby controlling the position of the general opening 300 on the parallax barrier shutter panel 21 in the lateral direction. In other words, according to the display device of the present preferred embodiment, when the observer moves in the horizontal direction, the general opening 300 can be moved in the lateral direction according to the position of the observer. As a result, the observer can see a 3D image, even if he/she moves.

When the variation in the distribution of light-distribution angle (distribution of light-distribution brightness) is large, or when the movement of the general opening 300 is not appropriate, the moving observer feels the variation (flicker) in the brightness of the 3D image. In order to reduce the variation in the brightness, it is necessary to satisfy conditions (C1) to (C3) described below. Specifically, the needed conditions are (C1): the brightness of the parallax images for left and right eyes of the observer is flat (constant) in the observation region where the changeover of the sub-opening 210 between the light transmittance state and the light shielding state is not carried out, (C2): there is a range where the parallax image for one eye is not observed in the region where the parallax image for the other eye is observed, and (C3): the brightness is flat (constant) on the moving route of the observer, even if the changeover of the sub-opening 210 between the light transmittance state and the light shielding state is carried out with the movement of the general opening 300. The structure satisfying three conditions described above will be described below.

<Condition (C1)>

The structure satisfying the condition (C1) will firstly be described. In this case, the distribution of the light-distribution angle of the light emitted from the sub-pixel 411a for displaying the right image and passing (transmitting) through the general opening 300 of the parallax barrier shutter panel 21 is considered with reference to FIG. 11. SW indicates the width of the general opening 300 (hereinafter referred to as "general opening width"), GW indicates the width of the light-emitting region of the sub-pixel 411 (hereinafter referred to as "sub-pixel width"), and BW indicates the width of the light-shielding wall 18 (hereinafter referred to as "light-shielding wall width").

Figure 11:
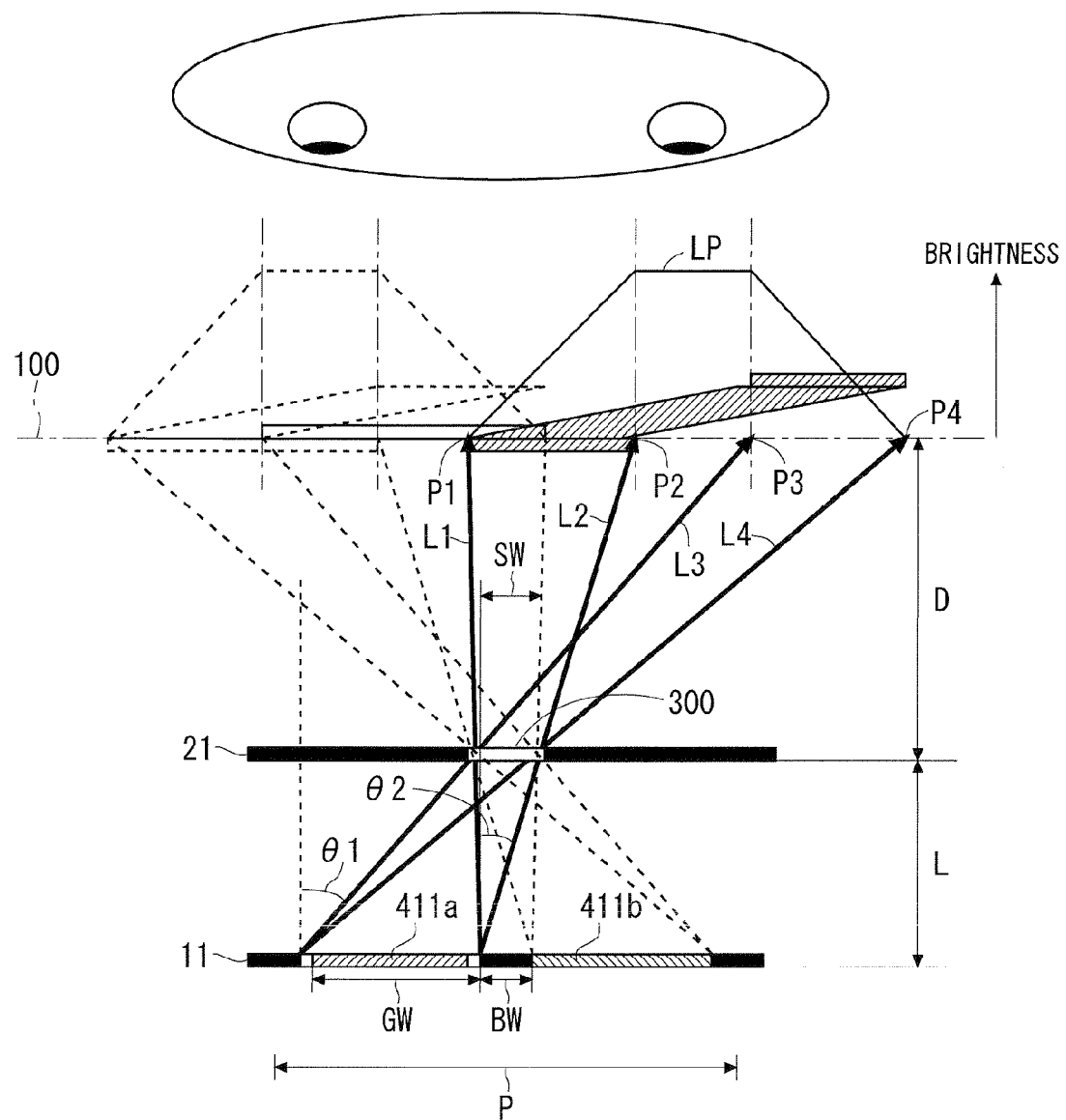
FIG. 11 is a view illustrating the configuration of the display device according to the first preferred embodiment.

In FIG. 11, the designed observation distance D is illustrated to be almost equal to the distance L (pixel to barrier distance L) between the parallax barrier shutter panel 21 and the sub-pixel 411 for the sake of convenience. However, in actuality, the designed observation distance D is 100 to 1000 times larger than the pixel to barrier distance L. For simplifying the description, it is supposed that the emission light from the sub-pixel 411 is uniform, regardless of the position and emission angle, and the emission light is not refracted on the surface of the parallax barrier shutter panel 21. Under this supposition, the apparent angle of the ray in the figure to the brightness of the sub-pixel 411 is meaningless, and the relative positional relationship between the sub-pixel 411 and the general opening 300, regarding the ray has a meaning.

Under the supposition described above, the brightness distribution (illumination distribution) of the light, emitted from the sub-pixel 411a for displaying the right image, on the virtual screen 100 apart from the glasses-free 3D display by the designed observation distance D will be described.

Rays L1 and L2 illustrated in FIG. 11 emitted from one point on the right end of the sub-pixel 411a pass through the general opening 300, and illuminate a hatched region between a position P1 and a position P2 on the virtual screen 100. Similarly, rays L3 and L4 emitted from one point on the left end of the sub-pixel 411a pass through the general opening 300, and illuminate a region between a position P3 and a position P4 on the virtual screen 100. The illuminated region is indicated by the hatched line as being slightly shifted up in FIG. 11 for the sake of convenience. Similarly, a ray emitted from an arbitrary one point of the sub-pixel 411a other than the right end and the left end also passes through the general opening 300, and illuminates an equivalent region. The illuminated region is continuously indicated between two hatched regions.

The brightness distribution of the sub-pixel 411a on the virtual screen 100 is obtained by adding up the lap of the hatched region for each position in the lateral direction. Accordingly, a brightness distribution LP illustrated in FIG. 11 is formed on the virtual screen 100 from the light from the sub-pixel 411a. FIG. 11 illustrates that, the height of the line of the brightness distribution LP corresponds to the height of the brightness. The brightness distribution is illustrated in the same manner in some figures described later.

In the light distribution LP, the portion between the position P2 and the position P3 is flat, but a slope is generated between the position P1 and the position P2, and between the position P3 nd the position P4.

In order to satisfy the above-mentioned condition (C1), i.e., in order to make the brightness flat (constant) as much as possible regardless of the distribution of the light-distribution angle, it is necessary to increase the distance between the position P2 and the position P3 for increasing the flat portion in the brightness distribution LP. Specifically, the emission angle $\theta 1$ of the ray L2 and the emission angle $\theta 2$ of the ray L3 are not parallel, but the difference between them has to be as large as possible. In other words, it is necessary that the difference between the sub-pixel width GW that is the width (the width of the sub-pixel 411) of the light-emitting region of the pixel and the general opening width SW is as large as possible. With this structure, the angular range where the brightness becomes constant increases.

FIG. 12 illustrates the calculation result of the distribution of the light-distribution angle of the light emitted from the sub-pixel 411 of the display panel 11 and passing through the general opening 300 on the parallax barrier shutter panel 21. In this case, the sub-pixel width GW of the display panel 11 is set as 0.050 mm, the reference parallax barrier pitch P of the parallax barrier shutter panel 21 is set as 0.100 mm, the pixel to barrier distance L is set as 1.000 mm, and the general opening width SW is set as 0.050 mm. The refractive index between the display panel 11 and the parallax barrier shutter panel 21 is set as 1.5. FIG. 12 illustrates the distribution of the light-distribution angle when the light-shielding wall width BW is changed to be 20%, 15%, and 10% of the reference parallax barrier pitch P under the condition described above.

FIG. 13 is a table illustrating the result of the examination of various properties including a brightness flat region angular width by changing the conditions. As illustrated in FIG. 13, when the difference between the width |GW−SW| is set as 0.020 mm, 0.015 mm, and 0.010 mm respectively under the conditions 1, 2, and 3, the brightness flat region angular width becomes 2 degrees, 1.5 degrees, and 1 degree, respectively. This result agrees with the above description that the flat portion of the brightness distribution increases, as the difference between the widths is larger. Accordingly, in order to satisfy the condition (C1), i.e., in order to increase the brightness flat region angular width, the difference between the sub-pixel width GW and the general opening width SW has to be increased.

<Condition (C2)>

Next, the structure satisfying the above-mentioned condition (C2), i.e., the structure satisfying the condition in which there is a range where the parallax image for one eye is not observed in the region where the parallax image for the other eye is observed, will be described below. In this case, the distribution of the light-distribution angle of surplus ray that is emitted from the sub-pixel 411b for displaying the left image and not shielded by a general light-shielding unit 400 will be considered with reference to FIG. 14. The general light-shielding unit 400 is a light-shielding portion formed on the parallax barrier shutter panel 21 by the sub-opening 210 that is in the light-shielding state, and SBW indicates the width of the general light shielding unit 400 (hereinafter referred to as "general light-shielding unit width").

Figure 14:
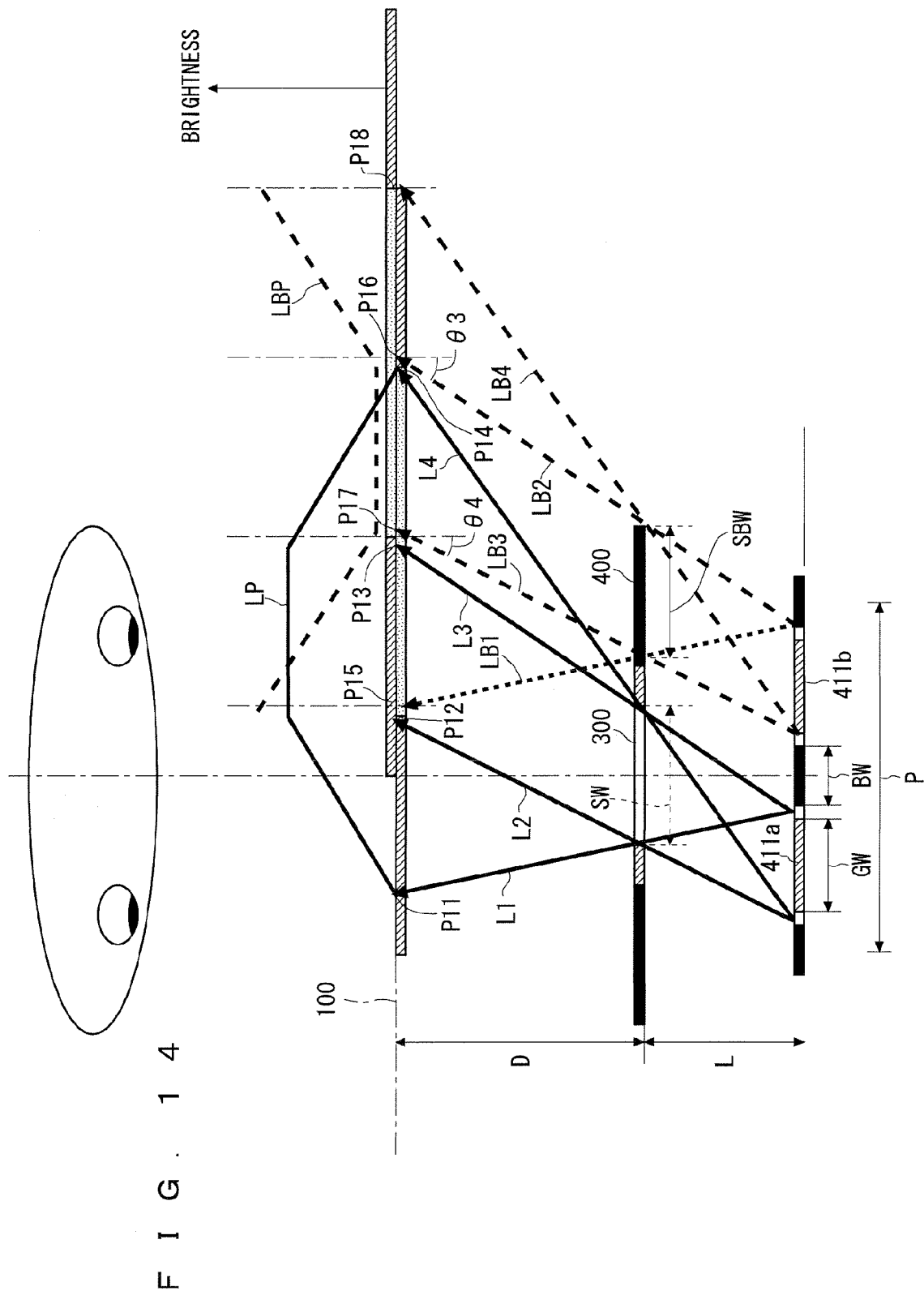
FIG. 14 is a view illustrating the configuration of the display device according to the first preferred embodiment.

As in FIG. 11, the designed observation distance D is illustrated to be almost equal to the pixel to barrier distance L in FIG. 14 for the sake of convenience. However, in actuality, the designed observation distance D is 100 to 1000 times larger than the pixel to barrier distance L. For simplifying the description, it is supposed that the emission light from the sub-pixel 411a is uniform, regardless of the position and emission angle, and the emission light is not refracted on the surface of the parallax barrier shutter panel 21. Under this supposition, the apparent angle of the line indicating the route of the ray in the figure to the brightness of the sub-pixel 411a is not so significant, and the relative positional relationship among the sub-pixel 411a, the general opening 300, and the general light-shielding unit 400 has a meaning, as with FIG. 11.

Under this supposition, the brightness distribution, on the virtual screen 100, of the surplus light emitted from the sub-pixel 411b for displaying the left image will be described.

Rays LB1 and LB2 indicated by a broken line and emitted from one point on the right end of the sub-pixel 411b illustrated in FIG. 14 are blocked by the general light-shielding unit 400. Therefore, light does not reach the portion between a position P15 and a position P16 on the virtual screen 100. Similarly, rays LB3 and LB4 indicated by a broken line and emitted from one point on the left end of the sub-pixel 411b are blocked by the general light-shielding unit 400. Therefore, light does not reach the portion between a position P17 and a position P18 on the virtual screen 100. Accordingly, a brightness distribution LBP illustrated in FIG. 14 is formed on the virtual screen 100 from the surplus light from the sub-pixel 411b.

A condition by which a complete light-shielding angle range where the parallax image is not observed is generated will be considered as the necessary condition for satisfying the above-mentioned condition (C2). In order to satisfy this condition, the position P17 has to be located to the left of the position P16. In order to allow this condition to be satisfied for any designed observation distance D, an emission angle θ3 of the ray LB2 is required to be not less than an emission angle θ4 of the ray LB3. In other words, it is necessary that the general light-shielding unit width SBW is not less than the sub-pixel width GW. The complete light-shielding angle range increases with the increase in the difference between the widths |SBW−GW|.

A condition for allowing the light from the sub-pixel 411a for displaying the right image to be present within the complete light-shielding angle range will be considered as the necessary condition for satisfying the above-mentioned condition (C2). In order to satisfy this condition, it is necessary that the general light-shielding unit width SBW is not less than the general opening width SW. In order to eliminate the positional deviation when the general light-shielding unit width SBW is equal to the general opening width SW (SBW=SW), it is necessary that the deviation in the center of the sub-pixel 411a is equal to the deviation between the center of the general opening 300 and the center of the general light-shielding unit 400, i.e., is a half the reference parallax barrier pitch P. This means that left and right light-shielding wall widths BW for the sub-pixel 411a and the sub-pixel 411b are required to be equal to each other.

For example, when the general light-shielding unit width SBW and the general opening width SW are respectively a half of the reference parallax barrier pitch P, and are equal to each other, and the light-shielding wall width BW of the display panel 11 is uniform, the complete light-shielding angle range of one of the sub-pixels 411a and 411b and the brightness flat region of the other are overlapped.

FIG. 13 that is previously described illustrates the result of the examination of the brightness flat region and the complete light-shielding region by changing the conditions. Under any of the conditions 1 to 6, the reference parallax barrier pitch P of the parallax barrier shutter panel 21 is set as 0.100 mm.

Under the conditions 1 to 3, the general opening width SW of the parallax barrier shutter panel 21 is larger than the sub-pixel width GW. Here, the general opening width SW is fixed to be 0.050 mm that is a half of the reference parallax barrier pitch P, and under the conditions 1, 2, and 3, the sub-pixel width GW is respectively set as 0.030 mm, 0.035 mm, and 0.040 mm. In this case, the difference between the widths |SW−GW| gradually decreases in the order of the conditions 1, 2, and 3. Therefore, the brightness flat region angular width is gradually decreased as described above.

FIG. 13 also illustrates a relative peak brightness. In general, the average brightness corresponding to the relative peak brightness is a value obtained by multiplying the brightness of the sub-pixel 411 of the display panel 11 by the smaller one of the ratio (GW/P) of the sub-pixel width GW to the reference parallax barrier pitch P and the ratio (SW/P) of the general opening width SW to the reference parallax barrier pitch P. Therefore, FIG. 13 also illustrates these ratios. Since the GW/P is smaller than SW/P under the conditions 1 to 3, not SW/P but GW/P corresponds to the relative peak brightness.

Under the conditions 1 to 3, the general light-shielding unit width SBW (=P−SW) becomes 0.050 mm. As described for the condition (C2), the complete light-shielding angle range (complete light-shielding angular width) corresponds to the difference between the widths |SBW−GW|.

Subsequently, the conditions 4 to 6 will be described. Under the conditions 4 to 6, the sub-pixel width GW is set to be larger than the general opening width SW of the parallax barrier shutter panel 21, contrary to the conditions 1 to 3. Here, the difference between the widths |SW−GW| is uniformly set as 0.02 mm, the sub-pixel width GW is respectively set as 0.040 mm, 0.045 mm, and 0.050 mm and the general opening width SW is respectively set as 0.020 mm, 0.025 mm, and 0.030 mm, under the conditions 4, 5, and 6. In this case, since the difference between the widths |SW−GW| is constant, the brightness flat region angular range becomes also constant.

Regarding the relative peak brightness under the conditions 4 to 6, since the SW/P is smaller than GW/P, not the ratio GW/P but the ratio SW/P corresponds to the relative peak brightness. Under the conditions 4, 5, and 6, the general light-shielding unit width SBW (=P−SW) is respectively 0.080 mm, 0.075 mm, and 0.070 mm. As described for the condition (C2), the complete light-shielding angle range (complete light-shielding angular width) corresponds to the difference between the widths |SBW−GW|. Here, 4 degrees, 3 degrees, and 2 degrees that are the complete light-shielding angular width under the conditions 4, 5, and 6 are not less than 2 degrees that is a maximum of the complete light-shielding angular width under the conditions 1 to 3.

Comparing the condition 1 and the condition 6, one of them is established by replacing the sub-pixel width GW and the general opening width SW in the other condition. However, it is found that the brightness flat region angular width, the relative peak brightness, and the complete light-shielding angular width of the condition 1 are equal to those of the condition 6 respectively. Although not illustrated, the brightness flat region angular width, the relative peak brightness, and the complete light-shielding angular width same as those under the condition 2 can be obtained, even under the condition in which the sub-pixel width GW and the general opening width SW are replaced with each other under the condition 2, for example.

In summary, the larger one of the GW/P and SW/P is preferably set as 40% to 50% from the viewpoint of increasing the brightness. When the smaller one becomes too large, |GW−SW| becomes small, so that the brightness flat region angle is narrowed. When the smaller one becomes too small, the relative peak brightness reduces. Therefore, they are appropriately set in consideration of these facts.

Since the light-shielding wall 18 is present in the actual liquid crystal display, the sub-pixel width GW is smaller than the half of the reference parallax barrier pitch P. Therefore, in the liquid crystal display, the general opening width SW and the sub-pixel width GW can be increased by setting the general opening width SW of the parallax barrier shutter panel 21 to be larger than the sub-pixel width GW.

<Condition (C3)>

Subsequently, the structure for satisfying the above-mentioned condition (C3), i.e., the structure satisfying the condition in which the brightness becomes flat (constant) on the moving route of the observer even if the changeover between the light-transmittance state and the light-shielding state of the sub-opening 210 is carried out with the movement of the general opening 300, will be described. In this case, the distribution of the light-distribution angle of the light emitted from the sub-pixel 411a for displaying the right image caused by the movement of the general opening 300 will be considered with reference to FIG. 15.

The supposition for FIGS. 11 and 14 is supposed to be applied even for FIG. 15. In this case, based upon the result of the condition (C1), the general opening width SW is set larger than the sub-pixel width GW in order to increase the region where the brightness becomes constant on the virtual screen 100, i.e., in order to increase the flat portion of the distribution of the light-distribution angle.

Under this supposition, the brightness distribution, on the virtual screen 100, of the light emitted from the sub-pixel 411a for displaying the right image will be described.

FIG. 15 illustrates the general opening 300 formed by three sub-openings 210a, 210b, and 210c. The ray emitted from the sub-pixel 411a passes through the sub-opening 210a to form a brightness distribution LP1 on the virtual screen 100. Similarly, the ray emitted from the sub-pixel 411a passes through the sub-openings 210b and 210c to form brightness distributions LP2 and LP3 on the virtual screen 100. A general brightness distribution TLP1 formed by combining these brightness distributions LP1, LP2, and LP3 becomes the actual brightness distribution formed on the virtual screen 100.

A ray L5 emitted from one point on the left end of the sub-pixel 411a and passes through the left end of the sub-opening 210a decides the position P22 on the virtual screen 100, corresponding to the left end of the flat portion of the general brightness distribution TLP1. A ray L6 emitted from one point on the right end of the sub-pixel 411a and passes through the right end of the sub-opening 210c decides the position P23 on the virtual screen 100, corresponding to the right end of the flat portion.

Subsequently, the case where the general opening 300 is formed with three sub-openings 210b, 210c, and 210d by allowing the sub-opening 210a to put into the light-shielding state and allowing the sub-opening 210d to put into the light transmittance state will be considered. Specifically, the case where the general opening 300 is transferred to the right by the sub-opening pitch ΔSW from the state described above will be considered. In this case, the brightness distribution LP1 is not formed, and the brightness distribution LP4 is formed by the ray emitted from the sub-pixel 411a and passing through the sub-opening 210. A general brightness distribution TLP2 formed by combining these brightness distributions LP2, LP3, and LP4 becomes the brightness distribution formed on the virtual screen 100 by the ray passing through the general opening 300.

A ray L7 emitted from one point on the left end of the sub-pixel 411a and passes through the left end of the sub-opening 210b decides the position P32 on the virtual screen 100 corresponding to the left end of the flat portion of the general brightness distribution TLP2. If the position P32 is located to the right of the position P23, a valley is formed between the flat portion of the general brightness distribution TLP1 and the flat portion of the general brightness distribution TLP2, so that the condition (C3) cannot be satisfied.

Therefore, in order to satisfy the condition (C3), the position P32 has to be located to the left of the position P23. When the designed observation distance D becomes long in the case where the angle θ5 between the ray L5 and the ray L7 is larger than the angle θ6 between the ray L5 and the ray L6 (in the case illustrated in FIG. 15), the ray L7 and the ray L6 cross each other, so that the position P32 might be located to the right of the position P23. In particular, in FIG. 15, since the designed observation distance D is set to be short for the sake of convenience, it is considered that this situation might occur in general.

Therefore, in order to satisfy the condition (C3) for any designed observation distance D, not the state in FIG. 15 is established, but the angle θ5 between the ray L5 and the ray L7 is required to be not more than the angle θ6 between the ray L5 and the ray L6. When the angle θ5 is approximated by the sub-opening pitch ΔSW, the angle θ6 can be approximated by the difference between the general opening width SW and the sub-pixel width GW. Accordingly, it is necessary that the sub-opening pitch ΔSW is not more than the difference between the general opening width SW and the sub-opening width GW.

When the observer moves in the direction (to the right) indicated by an arrow in FIG. 15, the detecting unit 31 detects the position (motion) of the observer. When the left eye of the observer is located between the positions P32 and P23, the control unit 32 controls to put the sub-opening 210a of the parallax barrier shutter panel 21 into the light-shielding state and put the sub-opening 210d into the light transmittance state based upon the detection result. Since the display device according to the present preferred embodiment is configured as described above, the observer can visually confirm the 3D image without feeling the variation in the brightness, even if he/she moves.

Figure 16:
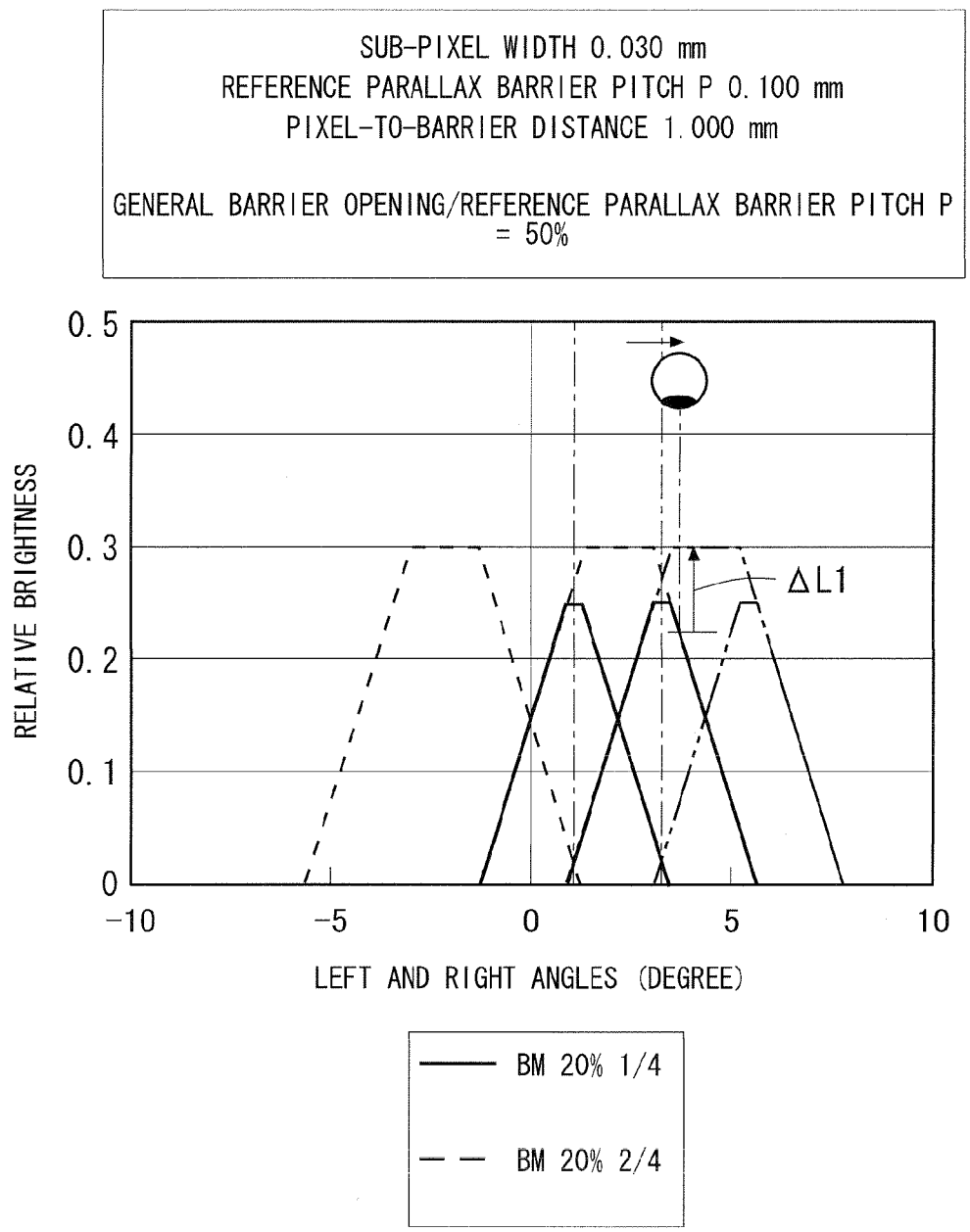
Figure 18:
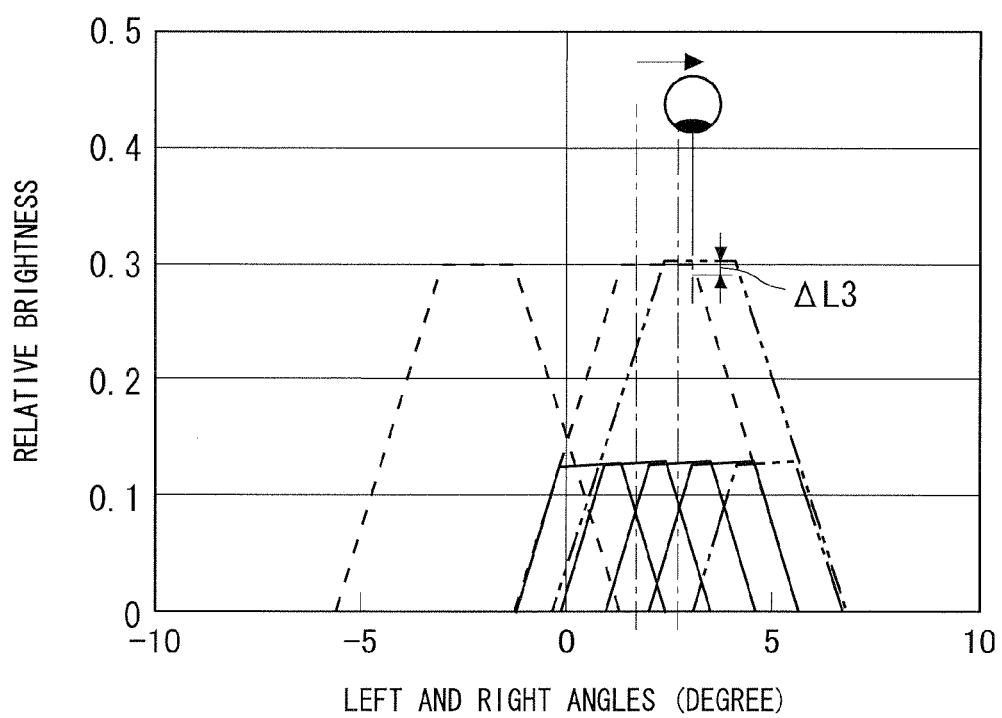

The content described above will be described next in detail with reference to FIGS. 16 to 19. FIGS. 16 to 19 illustrate the calculation result for the variation in the distribution of the light-distribution angle with the changeover action of the sub-opening 210. The condition for making the calculation for FIGS. 16 to 18 is almost the same as the condition 1 for FIG. 13. Here, the reference parallax barrier pitch P of the parallax barrier shutter panel 21 is set as 0.100 mm, the general opening width SW is set as 0.050 mm that is a half of the reference parallax barrier pitch P, the sub-pixel width GW is set as 0.030 mm, and the difference between the widths |GW−SW| is set as 0.020 mm.

FIGS. 16, 17, and 18 illustrate the calculation result under the condition 1 in which the sub-opening pitch ΔSW is 1/N (N: even number) of the reference parallax barrier pitch P. Specifically, the pitch is ¼ (N=4), ⅙ (N=6), and ⅛ (N=8) of the reference parallax barrier pitch P, respectively. Since the general opening width SW is 0.050 mm that is a half of the reference parallax barrier pitch P, the general opening 300 is made of N/2 sub-openings 210.

Under the condition having N=4 (hereinafter referred to as "condition 1-1") illustrated in FIG. 16, the sub-opening pitch ΔSW is 0.025 mm (=P/N) that is larger than the difference between the widths |GW−SW|=0.020 mm. Therefore, this structure does not satisfy the condition (C3). On the other hand, under the condition having N=6 (hereinafter referred to as "condition 1-2") illustrated in FIG. 17, the sub-opening pitch ΔSW is about 0.017 mm (=P/N) that is smaller than the difference between the widths |GW−SW|=0.020 mm. Therefore, this structure satisfies the condition (C3). Under the condition having N=8 (hereinafter referred to as "condition 1-3") illustrated in FIG. 18, the sub-opening pitch ΔSW is about 0.0125 mm (=P/N) that is smaller than the difference between the widths |GW−SW|=0.020 mm. Therefore, this structure satisfies the condition (C3).

In FIGS. 16 to 18, the brightness distribution of the light passing through the individual sub-opening 210 is indicated by a solid line, and the general brightness distribution that is formed by combining these distributions and has the flat portion is indicated by a broken line. In FIGS. 16 to 18, the general brightness distribution of the light passing through the general opening 300 when the general opening 300 is moved to the right by the sub-opening pitch ΔSW is indicated by a two-dot-chain line.

In each figure, a changeover point of a virtual position of the eye of the observer is indicated by a chain line. When the detecting unit 31 detects the eye of the observer moving to the right goes over the changeover point, the general brightness distribution is supposed to move to the right with its shape unchanged under the control of the control unit 32. Based upon the assumption described above, the calculation result under the conditions 1-1 to 1-3 will be described below.

Since the condition 1-1 is not the structure satisfying the condition (C3), a slope is generated between the flat portions of the general brightness distributions after and before the changeover as illustrated in FIG. 16. Therefore, the observer might feel the variation in the brightness, even if there is no time lag from when the eye of the observer goes over the changeover point till when the changeover of the sub-opening 210 is completed. When the time lag is long, this structure gives to the observer a great brightness variation ΔL1.

On the other hand, the condition 1-2 is the structure satisfying the condition (C3). Therefore, the flat portions of the general brightness distributions near the changeover point are overlapped, so that no slope is generated as illustrated in FIG. 17. Accordingly, the observer does not feel the variation in the brightness, if there is no time lag from when the eye of the observer goes over the changeover point till when the changeover of the sub-opening 210 is completed. Even if the time lag is somewhat long, this structure gives to the observer a relatively small brightness variation ΔL2.

Similarly, the condition 1-3 is a structure satisfying the condition (C3). Therefore, as in the condition 1-2, the observer does not feel the variation in the brightness, when there is no time lag upon the changeover of the sub-opening 210 for moving the general opening 300. Even if the time lag is somewhat long, this structure gives to the observer a relatively small brightness variation ΔL3. The brightness variation ΔL3 under the condition 1-3 is smaller than the brightness variation ΔL2 under the condition 1-2. Therefore, it is preferable that the sub-opening pitch ΔSW is as small as possible in order to be capable of reducing the brightness variation.

FIG. 19 illustrates the summary of the calculation result described above. In FIG. 19, the case where the flat portions of the general brightness distributions before and after the changeover are apart from each other is indicated by "x", the case where the flat portions are overlapped with each other with a narrow range is indicated by "○", and the case where the flat portions are overlapped with each other with a wide range is indicated by a double circle.

FIG. 19 also illustrates the calculation result in which the sub-opening pitch ΔSW is set as ⅙ (N=6), ⅛ (N=8), and 1/10 (N=10) of the reference parallax barrier pitch P under the condition 3 in FIG. 13. Under the condition 3-1 (N=6), the sub-opening pitch ΔSW is about 0.017 mm (=P/N) that is larger than the difference between the widths |GW−SW|=0.010 mm. Therefore, there is no lap between the flat portions. Under the condition 3-2 (N=8), the sub-opening pitch ΔSW is about 0.0125 mm (=P/N) that is larger than the difference between the widths |GW−SW|=0.010 mm. Therefore, there is no lap between the flat portions. On the other hand, under the condition 3-3 (N=10) for FIG. 17, the sub-opening pitch ΔSW is 0.010 mm (P/N) that is equal to the difference between the widths |GW−SW|=0.010 mm. Therefore, the flat portions are overlapped.

It is found from above that the sub-opening pitch ΔSW is required to be small in order to satisfy the condition (C3). Notably, when the separation width of the first transparent electrode 23 is set to be not more than about 1 μm, the cost for facilities for the production process might be increased and the frequency of occurrence of insulation failure might be increased in the current production technique. Therefore, it is desirable that the sub-opening pitch ΔSW is 4μm or more.

The realistic using condition of the display device is considered here. As the glasses-free 3D display having necessity to control the 3D display region according to the observation position of the observer, the case where one observer sees a fixed display, and the case where the sub-pixel width GW on a middle display having a size of 10 to 20 inches is 0.040 to 0.100 mm are considered. In this case, the reference parallax barrier pitch P is 0.080 to 0.200 mm.

In this case, when the sub-opening pitch ΔSW is 4μm, and the reference parallax barrier pitch P is 0.080 to 0.200 mm as described above, the sub-opening pitch ΔSW becomes 2% to 5% of the reference parallax barrier pitch P. Accordingly, the realistic division number N for obtaining the desired sub-opening pitch ΔSW is about 20 to 50 at a maximum according to the reference parallax barrier pitch P of 0.080 to 0.200 mm, respectively.

As the division number N increases, the total of the widths of the boundary portions between the first transparent electrodes 23 on the parallax barrier shutter panel 21 increases. The boundary portion cannot apply the electric field to the liquid crystal layer 24. When the boundary portion is set to be capable of transmitting light, light is leaked to deteriorate 3D crosstalk. On the contrary, when the boundary portion is made of a light absorbing member to block light, the light transmittance coefficient decreases.

FIG. 20 illustrates the relationship of the general relative peak brightness (to brightness of light-emitting unit of pixel) according to the division number N. In this case, it is supposed that the boundary portion is made of a light absorbing member, and the light transmittance is decreased, as the boundary portion (hereinafter referred to as "boundary light-shielding portion") increases.

The separation width is set as 1μm, and the boundary light-shielding portion is about twice (here, 2 μm) the separation width. The reference parallax barrier pitch P is fixed to be 0.100 mm, the general opening width SW is fixed to be 0.050 mm (50%), and the difference between the sub-opening width GW and the general opening width SW is just equal to the sub-opening pitch ΔSW, i.e., SW−GW=ΔSW.

As illustrated in conditions 7-1 to 7-7, the sub-opening pitch ΔSW decreases with the increase in the division number N. However, since GW=SW−ΔSW, and the general opening width SW is fixed, the sub-pixel width GW increases, and with this increase, the relative peak brightness (fourth items from the top of the table) also increases. As a result, the general relative peak brightness increases with the increase in the division number N in the conditions 7-1 to 7-4. However, with the increase in the division number N, the area ratio of the boundary light-shielding portion increases. Therefore, when the division number N becomes large to some extent, the reduction in the general relative peak brightness due to the increase in the area ratio of the boundary light-shielding portion becomes more noticeable than the increase in the general relative peak brightness due to the increase in the relative peak brightness. As a result, the general relative peak brightness decreases with the increase in the division number N in the conditions 7-4 to 7-7.

In this result, the general relative peak brightness assumes the maximum value in the case where the division number N is 10, and the general relative peak brightness exceeds 30% in the case where the division number N is 6 to 18. When the reference parallax barrier pitch P is smaller than 0.100 mm, and the width of the boundary light-shielding portion is larger than 2μm, the division number N by which the general relative peak brightness becomes the maximum decreases. On the contrary, when the reference parallax barrier pitch P is larger than 0.100 mm, and the width of the boundary light-shielding portion is smaller than 2μm, the division number N by which the general relative peak brightness becomes the maximum increases.

<Summary>

In the display device according to the present preferred embodiment described above, the pitch of the sub-opening 210 on the parallax barrier shutter panel 21 is not more than the difference between the horizontal width of the sub-pixel 411 on the display panel 11 and the horizontal width of the general opening 300 on the parallax barrier shutter panel 21. Therefore, the generation of the valley between the flat portions of the brightness distributions before and after the changeover can be prevented, whereby the variation in the brightness that the moving observer feels is eliminated, and the flicker can be prevented.

As described above, it is desirable that the larger one of the ratio (GW/P) of the sub-pixel width GW to the reference parallax barrier pitch P and the ratio (SW/P) of the general opening width SW to the reference parallax barrier pitch P is set as 40% to 50%. Since the sub-opening pitch ΔSW is appropriately ⅙ to 1/18 of the reference parallax barrier pitch P, it is appropriate that the sub-opening pitch ΔSW is 10% to 25% of the reference parallax barrier pitch P. Specifically, the smaller one of the ratio (GW/P) and the ratio (SW/P) is appropriately set as a value obtained by subtracting 10% to 25% from the larger one. However, it is desirable that the smaller one is set to be a value obtained by subtracting 10% to 20% from the larger one in order to avoid 50 percent reduction in transmittance.

By setting as described above, the light use efficiency can be enhanced. Consequently, the brightness variation caused when the general opening 300 is shifted by making the changeover between the light-shielding state and the light transmittance state of the sub-opening 210 located on the end of the general opening according to the position of the observer can be eliminated, which does not let the observer feel the flicker.

As described above, the detecting unit 31 in FIG. 1 detects a position (motion) of an observer.

The control unit 32 changes the sub-opening 210, which is to be put into the light transmittance state, out of the sub-openings 210, based upon the detection result of the detecting unit 31, thereby controlling the position of the general opening 300 in the lateral direction on the parallax barrier shutter panel 21. In other words, according to the display device of the present preferred embodiment, when the observer moves in the horizontal direction, the general opening 300 can be moved in the lateral direction according to the position of the observer. As a result, the observer can see a 3D image, even if he/she moves. However, there may be the case where the detecting unit 31 cannot detect the position of the observer, such as in case where the observer moves to the position greatly tilted from the front of the display device. In this case, if all sub-openings 210 on the parallax barrier shutter panel 21 are put into the light transmittance state, and simultaneously, the same image data is displayed on the sub-pixel 411a and the sub-pixel 411b on the display panel 11, a two-dimensional image can be displayed. According to this structure, the image can surely be displayed even when the detecting unit 31 malfunctions.

In this case, one two-dimensional image data may be displayed by using both the sub-pixel 411a and the sub-pixel 411b on the display panel 11. In this case, the normal two-dimensional image can surely be displayed, even when the detecting unit 31 malfunctions.

<Second Preferred Embodiment>

In the first preferred embodiment, the number of the first transparent electrodes 23 arranged in the longitudinal direction of the parallax barrier shutter panel 21 is N/2 times the number of the wirings arranged in the longitudinal direction of the display panel 11. Specifically, the number of the first transparent electrodes is relatively large. In this structure, the drive of the segment system on the parallax barrier shutter panel 21 is difficult. The number of the joint points with a flexible circuit board for externally applying voltage increases, and the pitch of the joint portions becomes small, which makes the mounting work somewhat difficult. Alternatively, the number of the necessary driving ICs increases, which might increase the cost of the components.

A glasses-free 3D display (display device) according to the second preferred embodiment of the present invention can solve the problem described above. In the description of the glasses-free 3D display (display device) according to the present preferred embodiment, the components same as or similar to those described in the first preferred embodiment are identified by the same numerals, and the different point will mainly be described.

FIG. 21 is a plan connecting diagram illustrating the structure of the parallax barrier shutter panel 21 of the glasses-free 3D display according to the present preferred embodiment, when the display rotates 90 degrees. In the present preferred embodiment, plural common driving areas (common driving region) 251 are formed by dividing the display area of the parallax barrier shutter panel 21 in the horizontal direction. A first sub-pixel pair 41a and a second sub-pixel pair 41b that are adjacent to each other in the lateral direction (in the horizontal direction in FIG. 21) belong to one common driving area 251. FIG. 21 only illustrates one set of first and second sub-pixel pairs 41a and 41b for the sake of convenience. However, the same applies to the other region, although not illustrated. FIG. 21 does not illustrate the general opening 300 on the first and second sub-pixel pairs 41a and 41b for the sake of convenience.

The first transparent electrode 23 extends in the longitudinal direction (in the vertical direction in FIG. 21). The plural first transparent electrodes 23 are divided into N (N=8) that is an even number within the reference parallax barrier pitch P corresponding to each sub-pixel pair 41. Specifically, the even number (here, eight) of the plural first transparent electrodes 23 are arranged so as to correspond to each sub-pixel pair 41. The number of wirings forming the general opening 300 is specified as N/2 (here, four).

In the present preferred embodiment, each of the even number (eight) of the first transparent electrodes 23 corresponding to the first sub-pixel pair 41a and each of the even number (eight) of the first transparent electrodes 23 corresponding to the second sub-pixel pair 41b are electrically connected in correspondence with the position of the sub-opening 210 with respect to one common driving area 251.

For example, the first transparent electrode 23 designated by a number (1) on the first sub-pixel pair 41a is electrically connected to the first transparent electrode 23 (the first transparent electrode 23 to which the position of the sub-opening 210 corresponds) designated by a number (1) on the second sub-pixel pair 41b with a common wiring 201 and a contact hole 202. Similarly, the first transparent electrodes 23 designated by (2) to (8) on the first sub-pixel pair 41a are electrically connected to the first transparent electrodes 23 (the first transparent electrode 23 to which the position of the sub-opening 210 corresponds) designated by (2) to (8) on the second sub-pixel pair 41b with the common wiring 201 and the contact hole 202. Eight of the common wiring 201 connected to the first transparent electrodes 23 designated by (1) to (8) are respectively connected to eight terminals La1 to La8. Even in the common driving area 251 adjacent to the common driving area 251 corresponding to the first transparent electrodes 23 connected to the terminals La1 to La8, the first transparent electrodes 23 are similarly provided, and they are connected to terminals La9 to La16.

In the display device described above, when voltage is selectively applied to the terminals La1 to La8, the same voltage can uniformly be applied to the first transparent electrodes 23 designated by the same number in the common driving area 251, and different voltage can be applied to the first transparent electrodes 23 designated by different number.

The plural second transparent electrode 25 will next be described. As illustrated in FIG. 21, the plural second transparent electrodes 25 extend in the lateral direction. Each of the second transparent electrodes 25 is provided to correspond to a row of the sub-pixel pair 41 arranged in the lateral direction. The plural second transparent electrodes 25 are arranged with a pitch equal to the pitch of the sub-pixel pair 41 on the display panel 11 in the longitudinal direction. More strictly, the pitch is desirably set to be small with a ratio of the distance between the sub-pixel pair 41 and the parallax barrier to the distance between the parallax barrier and the designed observation position. For example, when the distance between the sub-pixel pair 41 and the parallax barrier is set as 1.5 mm, the refractive index of a medium between the sub-pixel pair 41 and the parallax barrier is set as 1.5, and the distance between the parallax barrier and the designed observation position is set as 1000 mm, the second transparent electrodes 25 are desirably arranged with a pitch obtained by multiplying the pitch of the sub-pixel pair 41 on the display panel 11 in the longitudinal direction by 0.999. This is because the sub-pixel pair 41 corresponding to the general opening 300 on the parallax barrier can correctly be covered from the center to the upper and lower ends of the screen, as viewed from the designed observation distance.

The second transparent electrodes 25 located on the odd-numbered rows in the longitudinal direction are connected to a common wiring 211 connected to a terminal Lb1, while the second transparent electrodes 25 located on the even-numbered rows are connected to the common wiring 211 connected to a terminal Lb2.

According to the display device described above, the same voltage can uniformly be applied to the second transparent electrodes 25 on the even-numbered rows or on the odd-numbered rows within the common driving area 251, and different voltage can be applied to the second transparent electrodes 25 on the even-numbered rows and the second transparent electrodes 25 on the odd-numbered rows, by selectively applying voltage to the terminals Lb1 and Lb2.

The terminals La1 to La8 and the terminals Lb1 and Lb2 are configured to be bonded to the flexible circuit board or the driving IC on the peripheral portion outside the display region of the parallax barrier shutter panel 21, and to receive external voltage via these components. The display device described above has no necessity to provide the terminal for controlling the sub-opening 210 to each of the first transparent electrode 23 and the second transparent electrode 25. For example, when each sub-opening 210 is driven in one common driving area 251 illustrated in FIG. 21, thirty-two terminals for the first transparent electrodes 23 and two terminals for the second transparent electrodes 25, i.e., thirty-four terminals in total, are needed in the conventional case. However, according to the present preferred embodiment, eight terminals (terminals La1 to La8) for the first transparent electrodes 23 and two terminals (terminals Lb1 and Lb2) for the second transparent electrodes 25, i.e., ten terminals in total, are only necessary.

In the display device according to the present preferred embodiment, the first transparent electrode 23 corresponding to the first sub-pixel pair 41a is electrically connected to the first transparent electrode 23 corresponding to the second sub-pixel pair 41b. Therefore, the number of the terminals for the first transparent electrodes 23 can be reduced. Accordingly, the size of the substrate on which the first transparent electrodes 23 are provided can be decreased, whereby the mounting work can be facilitated. Since the number of the driving ICs can be decreased, the cost of the components can be reduced.

The operation of the display device according to the present preferred embodiment described above will be described below.

FIG. 22 illustrates a pattern of the voltage applied to the terminals La1 to La8 and the terminals Lb1 and Lb2 of the parallax barrier shutter panel 21 according to the present preferred embodiment. "○" in FIG. 22 indicates that the sub-opening 210 is in the light transmittance state, while "×" indicates that the sub-opening 210 is in the light-shielding state. In the present preferred embodiment, the normally black twisted nematic (TN) mode is supposed as the liquid crystal mode of the liquid crystal layer 24 of the parallax barrier shutter panel 21. The number of wirings forming the general opening 300 is N/2 (here, four).

The voltage applied to the terminals La1 to La8 and the terminals Lb1 and Lb2 has two values such as a positive voltage and 0 voltage. In this case, the display-surface polarizing plate 27, the intermediate polarizing plate 17, and the liquid crystal layer 24 illustrated in FIG. 1 are appropriately provided in such a manner that, when the combination of the voltages applied to the terminals Lam1 (m1=1 to 8) and to the terminals Lbm2 (m2=1, 2) is 0/+ or +/0, the sub-opening 210 corresponding to the corresponding terminal Lam1 and Lbm2 is in the light transmittance state in the TN mode. The display-surface polarizing plate 27, the intermediate polarizing plate 17, and the liquid crystal layer 24 illustrated in FIG. 1 are also appropriately provided in such a manner that, when the combination of the voltages applied to the terminal Lam1 and to the terminal Lbm2 is 0/0 or +/+, the sub-opening 210 corresponding to the corresponding terminals Lam1 and Lbm2 is in the light-shielding state in the TN mode. A different voltage is applied to the second transparent electrodes 25 on the even-numbered rows and to the second transparent electrodes 25 on the odd-numbered rows.

The specific operation will be described next with reference to a voltage pattern No. 1 illustrated in FIG. 22. In the voltage pattern No. 1, the + voltage is applied to the terminals La1 to La4 for the first transparent electrodes 23, 0 voltage is applied to the terminals La5 to La8 for the first transparent electrodes 23, 0 voltage is applied to the terminal Lb1 for the second transparent electrodes 25 on the odd-numbered row, and + voltage is applied to the terminal Lb2 for the second transparent electrodes 25 on the even-numbered row.

In this case, four sub-openings 210 corresponding to the combination of the first transparent electrodes 23 designated by (1) to (4) and the second transparent electrodes 25 on the odd-numbered rows are put into the light transmittance state, while four sub-openings 210 corresponding to the combination of the first transparent electrodes 23 designated by (5) to (8) and the second transparent electrodes 25 on the odd-numbered rows are put into the light-shielding state. Specifically, the general opening 300 equivalent to the pattern 1 illustrated in FIG. 3 is formed.

Figure 7:
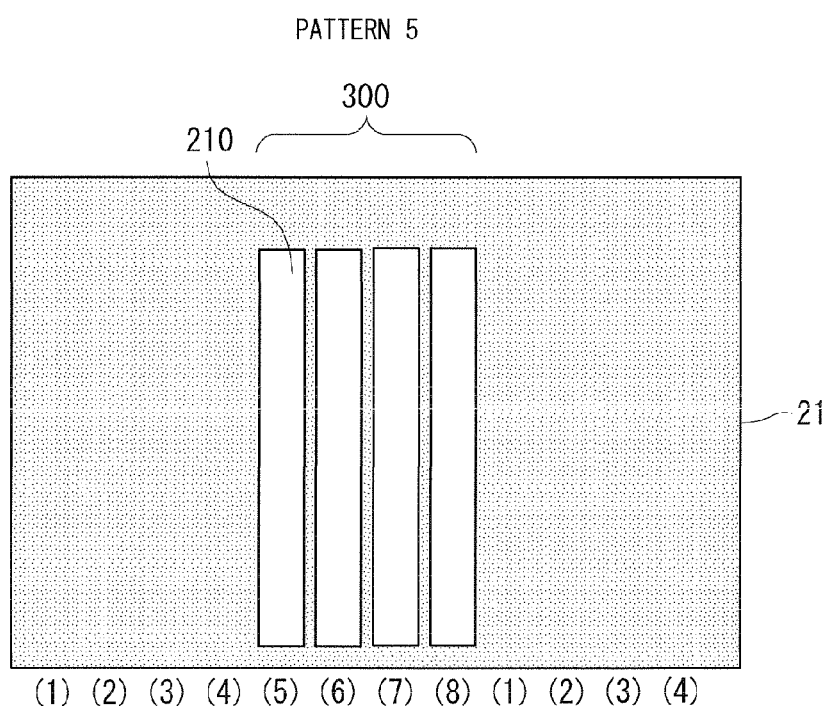
Figure 10:
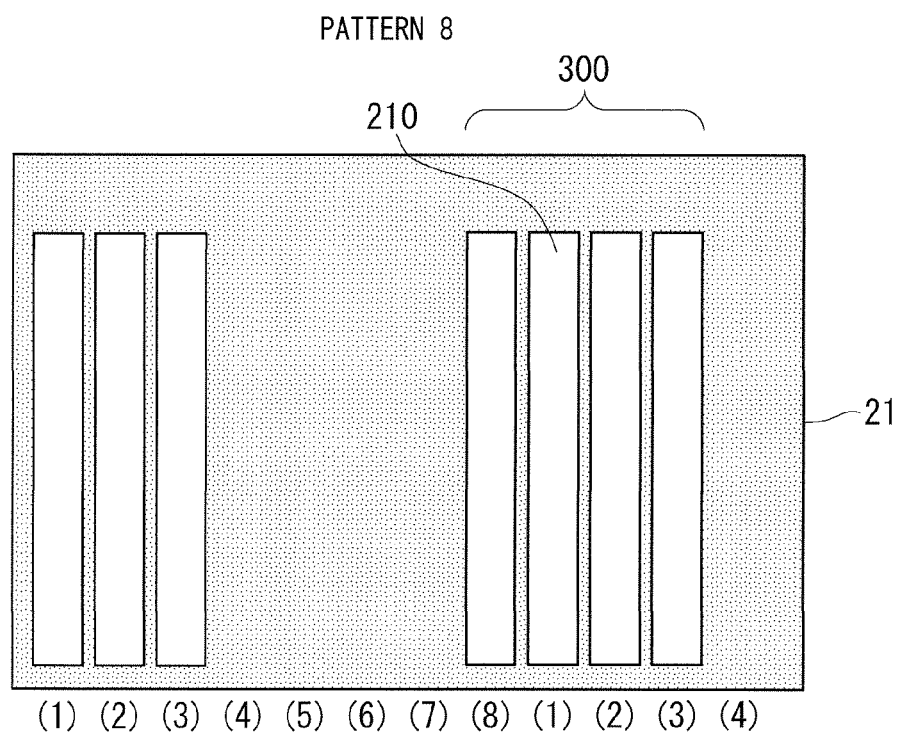

In this case, four sub-openings 210 corresponding to the combination of the first transparent electrodes 23 designated by (1) to (4) and the second transparent electrodes 25 on the even-numbered rows are put into the light-shielding state, while four sub-openings 210 corresponding to the combination of the first transparent electrodes 23 designated by (5) to (8) and the second transparent electrodes 25 on the even-numbered rows are put into the light transmittance state. Specifically, the general opening 300 equivalent to the pattern 5 illustrated in FIG. 7 is formed.

As described above, since each of the second transparent electrodes 25 is provided to correspond to a row of each of the sub-pixel pairs 41 arranged in the lateral direction in the display device according to the present preferred embodiment, the control for the sub-opening 210 illustrated in FIG. 22 can be done. Accordingly, the twisted nematic (TN) mode can be applied.

In the above description, the position (pattern 1) of the general opening 300 on the second transparent electrode 25 on the odd-numbered row (the sub-pixel pair 41 on the odd-numbered row) and the position (pattern 5) of the general opening 300 on the second transparent electrode 25 on the even-numbered row (the sub-pixel pair 41 on the even-numbered row) are shifted from each other by a half (by one sub-pixel 411) of the reference parallax barrier pitch P on the parallax barrier shutter panel 21.

Figure 23:
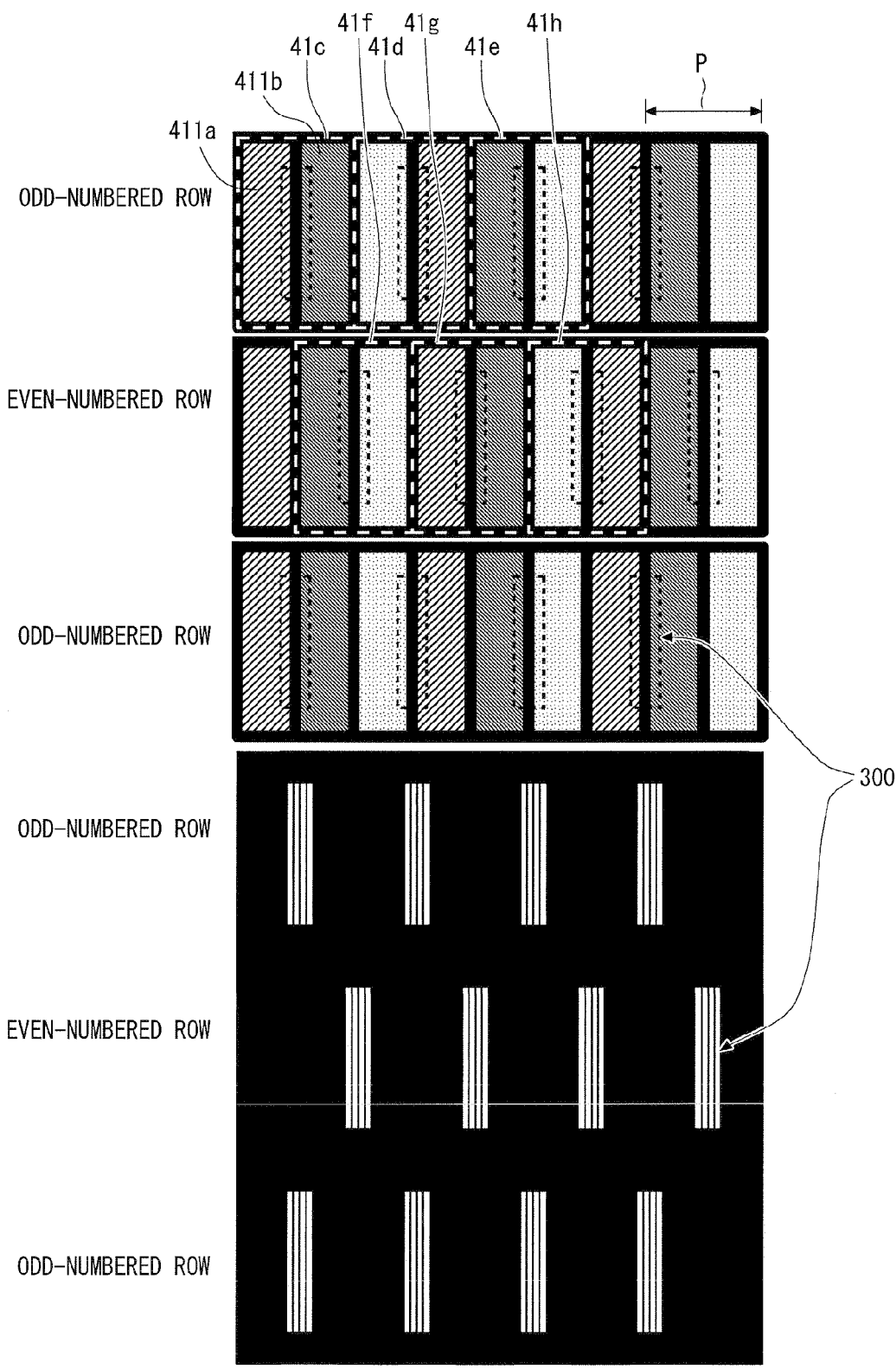

FIG. 23 is a plan view illustrating the arrangement of the general opening 300 on the glasses-free 3D display according to the present preferred embodiment. In FIG. 23, the adjacent sub-pixel pairs 41 in the longitudinal direction are arranged to be shifted in the lateral direction by one sub-pixel 411. For example, in the present preferred embodiment, the third to fifth sub-pixel pairs 41c to 41e on the odd-numbered rows on the display panel 11 and the sixth to eighth sub-pixel pairs 41f to 41h on the even-numbered rows are shifted in the lateral direction by one sub-pixel 411.

With this structure, between the odd-numbered row and the even-numbered row, the position of the sub-pixel pair 41 on the parallax barrier shutter panel 21 is shifted by one sub-pixel 411, the plural first transparent electrodes 23 are divided into N (N=8) that is an even number in the reference parallax barrier pitch P in the lateral direction corresponding to each sub-pixel pair 41, the number of the wirings forming the general opening 300 is N/2 (here, four), the plural second transparent electrodes 25 are provided with the pitch equal to the pitch in the longitudinal direction of the sub-pixel pair 41 arranged in the lateral direction, and different voltage is applied to the second transparent electrodes on the odd-numbered rows and to the second transparent electrodes on the even-numbered rows. Accordingly, the position of the general opening 300 on the parallax barrier shutter panel 21 is shifted by one sub-pixel 411 as described with reference to FIG. 22. Consequently, the positional relationship between the sub-pixel pair 41 and the general opening 300 is the same for the odd-numbered rows and for the even-numbered rows. According to this structure, although the resolution in the lateral direction from one viewpoint is decreased in half, the pixel arrangement (checkered flag pattern) in which the sub-pixel pair is shifted by one sub-pixel 411 between the odd-numbered row and the even-numbered row can be realized. In the glasses-free 3D display device of a parallax barrier system, the resolution is reduced to a half of the resolution of displaying a general two-dimensional image, but a sense of resolution can be enhanced by the arrangement of the checkered flag pattern.

Figure 24:
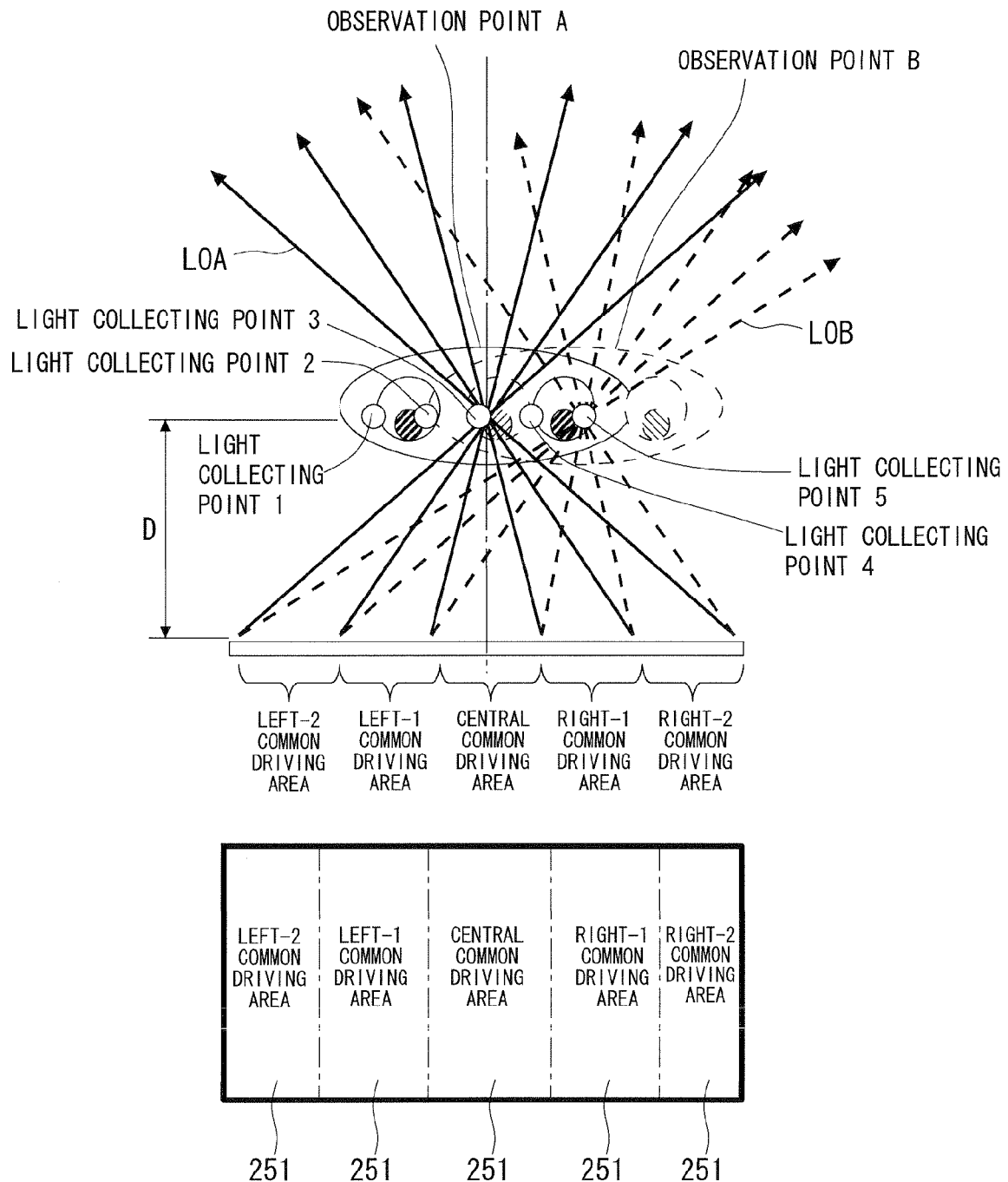

FIG. 24 is a schematic sectional view illustrating a boundary line agreeing with a virtual ray that is virtually emitted from the center of the light-shielding wall 18 between the sub-pixels 411a and 411b forming the sub-pixel pair 41. The control of the parallax barrier shutter panel 21 in the display device according to the present preferred embodiment will next be described with reference to FIG. 24. In the description below, it is supposed that the glasses-free 3D display is divided into five common driving areas 251 (left-2 common driving area to right-2 common driving area).

In FIG. 24, some of the boundary lines (virtual rays) are indicated by an arrow.

A boundary line LOA indicated by a solid line represents the boundary line when the voltage is applied with the voltage pattern No. 3 described above to the plural first transparent electrodes 23 and the plural second transparent electrodes 25 (hereinafter referred to as "the electrode group in each common driving area 251") in each common driving area 251. As illustrated in FIG. 24, the display device according to the present preferred embodiment is configured such that the boundary line LOA in each common driving area 251 is collected on a light collecting point 3 indicated by a white circle.

Similarly, a boundary line LOB indicated by a broken line represents a boundary line when the voltage is applied to the electrode group in each common driving area 251 with the voltage pattern No. 5 described above. As illustrated in FIG. 24, the display device according to the present preferred embodiment is configured such that the boundary line LOB in each common driving area 251 is collected on a light collecting point 5 indicated by a white circle. Similarly, the display device according to the present preferred embodiment is configured such that the boundary line of each common driving area 251 is collected on light collecting points 1, 2, and 4 indicated by a white circle, when the voltage is applied to the electrode group in each common driving area 251 with the voltage patterns No. 1, 2, and 4, respectively.

In general, a satisfactory image cannot be observed near the boundary line, since the brightness difference or 3D crosstalk is great. In view of this, in the present preferred embodiment, the control unit 32 decides the position of the general opening 300 on the parallax barrier shutter panel 21 for each common driving area 251 based upon the detection result of the detecting unit 31. Specifically, the control unit 32 controls the parallax barrier shutter panel 21 such that the boundary line of each common driving area 251 is condensed on only any one of the light collecting points 1 to 5, when determining that the observer is located near the position with the designed observation distance D, based upon the detection result of the detecting unit 31.

Specifically, when the observer is located on an observation point A apart from the glasses-free 3D display in the direction of the front of the screen by the designed observation distance D, the voltage is applied to the electrode group in each common driving area 251 with the voltage pattern No. 3. With this, the boundary line from each common driving area 251 can be condensed on the light collecting point 3 located in the middle of the left eye and the right eye of the observer.

When the observer moves to an observation point B where one eye is located on the light collecting point 3, the voltage is applied to the electrode group in each common driving area 251 with the voltage pattern No. 5, whereby the boundary line from each common driving area 251 is condensed on the light collecting point 5 located in the middle of the left eye and the right eye of the observer.

The display device operated as described above according to the present preferred embodiment can collect the boundary line on one point between the left eye and the right eye in order to reduce the possibility of the boundary line being inputted to the left eye and the right eye. Accordingly, the observer can observe a satisfactory 3D image all over the screen.

Figure 25:
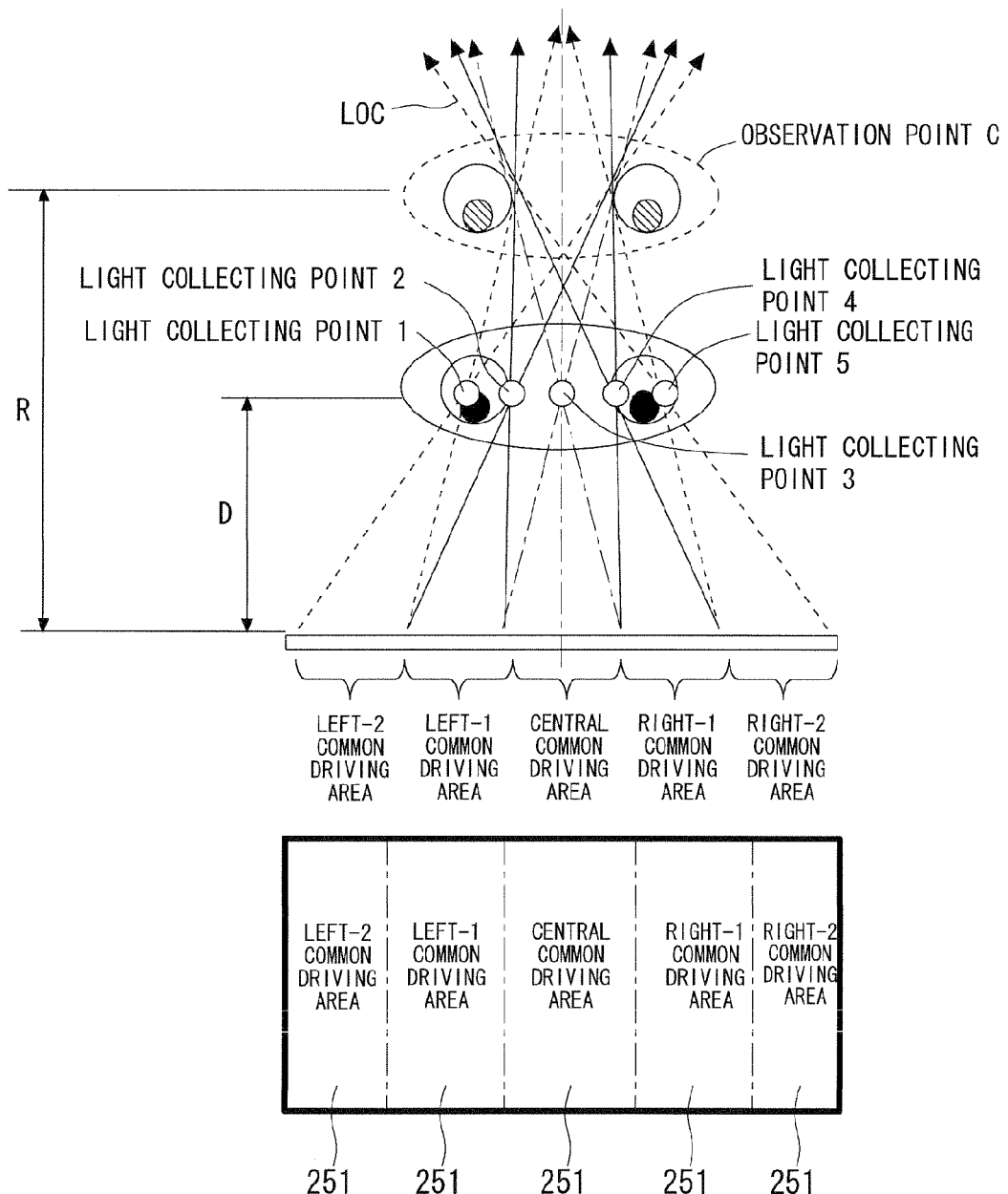

FIG. 25 is a schematic sectional view illustrating boundary lines, like FIG. 24. FIG. 25 illustrates boundary lines when the observer is on an observation point C apart from the glasses-free 3D display by an actual observation distance R longer than the designed observation distance D.

The control unit 32 according to the present preferred embodiment controls the parallax barrier shutter panel 21 such that the boundary line of each common driving area 251 is condensed on different light collecting points 1 to 5, when determining that the observer is located on a point with the distance longer than the designed observation distance D, based upon the detection result of the detecting unit 31.

Specifically, as illustrated in FIG. 25, when the observer is on the observation point C, the control unit 32 applies the voltage to the electrode group in the central common driving area 251 with the voltage pattern No. 3, thereby collecting the boundary line from the central common driving area 251 on the light collecting point 3. The control unit 32 also applies the voltage to the electrode group in the left-2 common driving area 251 with the voltage pattern No. 1, thereby collecting the boundary line from the left-2 common driving area 251 on the light collecting point 1. Similarly, the control unit 32 collects the boundary lines from the left-1 common driving area 251, the right-1 common driving area 251, and the right-2 common driving area 251 onto the light collecting points 2, 4, and 5, respectively.

The boundary lines collected on each of the light collecting points 1 to 5 again spread on the region with the distance longer than the designed observation distance D. However, the horizontal width of each common driving area 251 is ⅕ of the horizontal width of the whole screen (the whole glasses-free 3D display), so that the width of the boundary lines from each common driving area 251 on the region with the distance longer than the designed observation distance D is smaller than the width of the boundary lines from the whole screen. Accordingly, the display device according to the present preferred embodiment can reduce the spread of each boundary line on the region with the distance longer than the designed observation distance D. Consequently, the possibility that the boundary lines are inputted into the left eye and the right eye of the observer on the point at a little distance away can be reduced, whereby even this observer can observe the satisfactory 3D image all over the screen.

Figure 26:
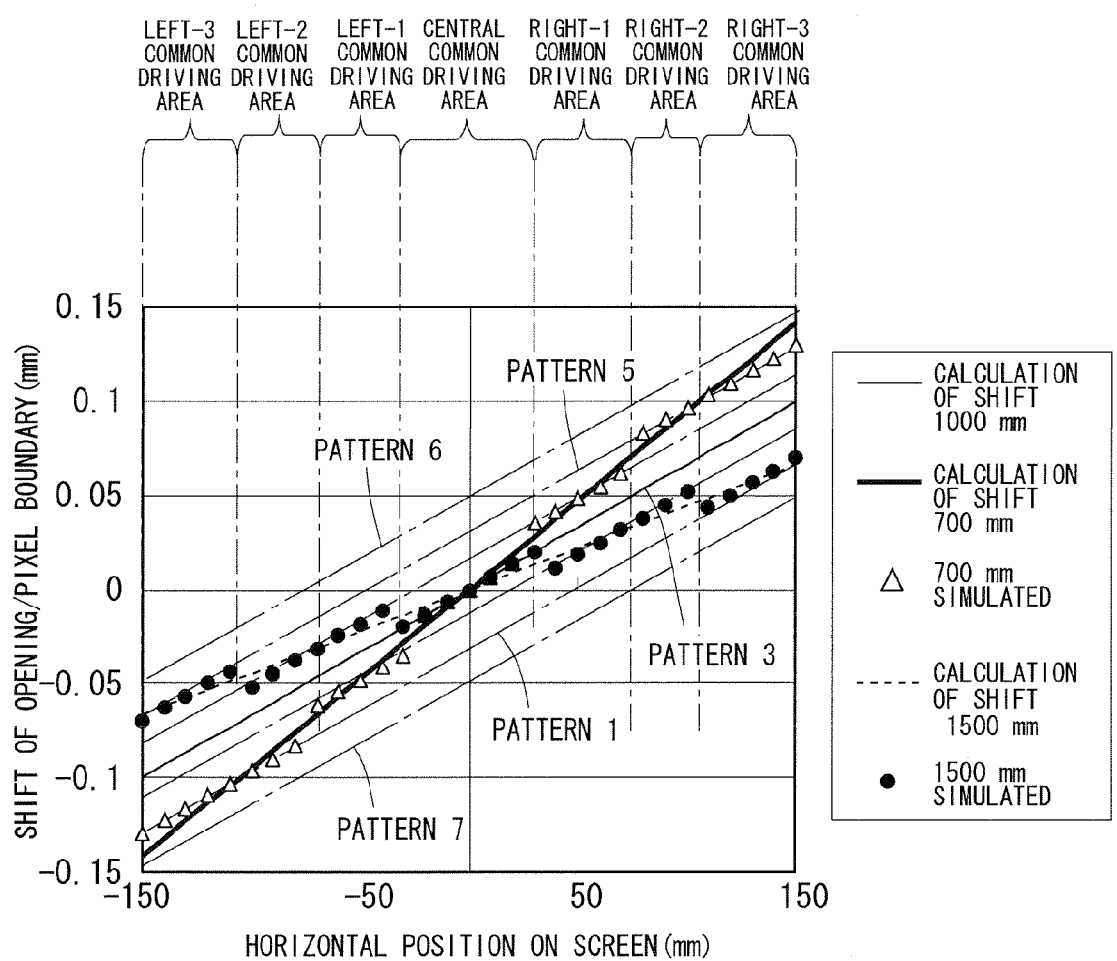

FIG. 26 illustrates a calculation result of an optimum amount of a shift that should be generated between the center position of the boundary of the sub-pixel pair 41 and the center position of the general opening 300 in order that the boundary lines from all over the screen can be collected on one point between the left eye and the right eye of the observer. The reference parallax barrier pitch P is set as 0.100 mm, and the sub-opening pitch $\Delta SW$ is set as 0.015 mm. In FIG. 26, the common driving area 251 is divided into seven, and seven voltage patterns are prepared.

This figure illustrates the optimum amount of the shift that should be generated in the horizontal direction on the screen between the center of the boundary of the sub-pixel pairs 41 and the center of the general opening 300, when the observation distance to the observer is 700 mm, 1000 mm, and 1500 mm. As illustrated, the optimum shift amount linearly changes. Therefore, the actual shift amount is desirably changed linearly. However, since the sub-opening pitch $\Delta SW$ has a finite value, the realistic actual shift amount just has to be changed in a stepwise manner.

A chain line in the figure indicates the realistic shift amount between the center of the boundary of the sub-pixel pairs 41 and the center of the general opening 300, when each of the seven voltage patterns is commonly applied to the whole screen. In order to realize the satisfactory display of the 3D image all over the screen, the voltage pattern corresponding to the realistic actual shift amount closest to the optimum shift amount is only selected in the respective common driving areas 251, as indicated by black circles and white triangles.

As described above, in the present preferred embodiment, the control unit 32 decides the position of the general opening 300 on the parallax barrier shutter panel 21 for each common driving area 251 based upon the detection result of the detecting unit 31. Consequently, the possibility that the boundary lines are inputted into the left eye and the right eye of the observer on the point at a little distance away can be reduced, whereby this observer can observe the satisfactory 3D image all over the screen. The number of times of the calculation for deciding the pattern position is limited to the division number of the common driving area 251. Therefore, the time taken for the calculation can be shortened. Specifically, according to the present preferred embodiment, the time taken from the detection of the position of the observer by the detecting unit 31 till the completion of the transfer of the general opening 300 on the parallax barrier shutter panel 21 can be shortened, whereby the brightness variation can be reduced. The position of the general opening 300 (barrier) can be decided according to the same calculation procedure, regardless of whether the observer is on a point with a distance longer or shorter than the designed visible distance. Therefore, the program for operating the display device is expected to be simplified.

<Third Preferred Embodiment>

Figure 27:
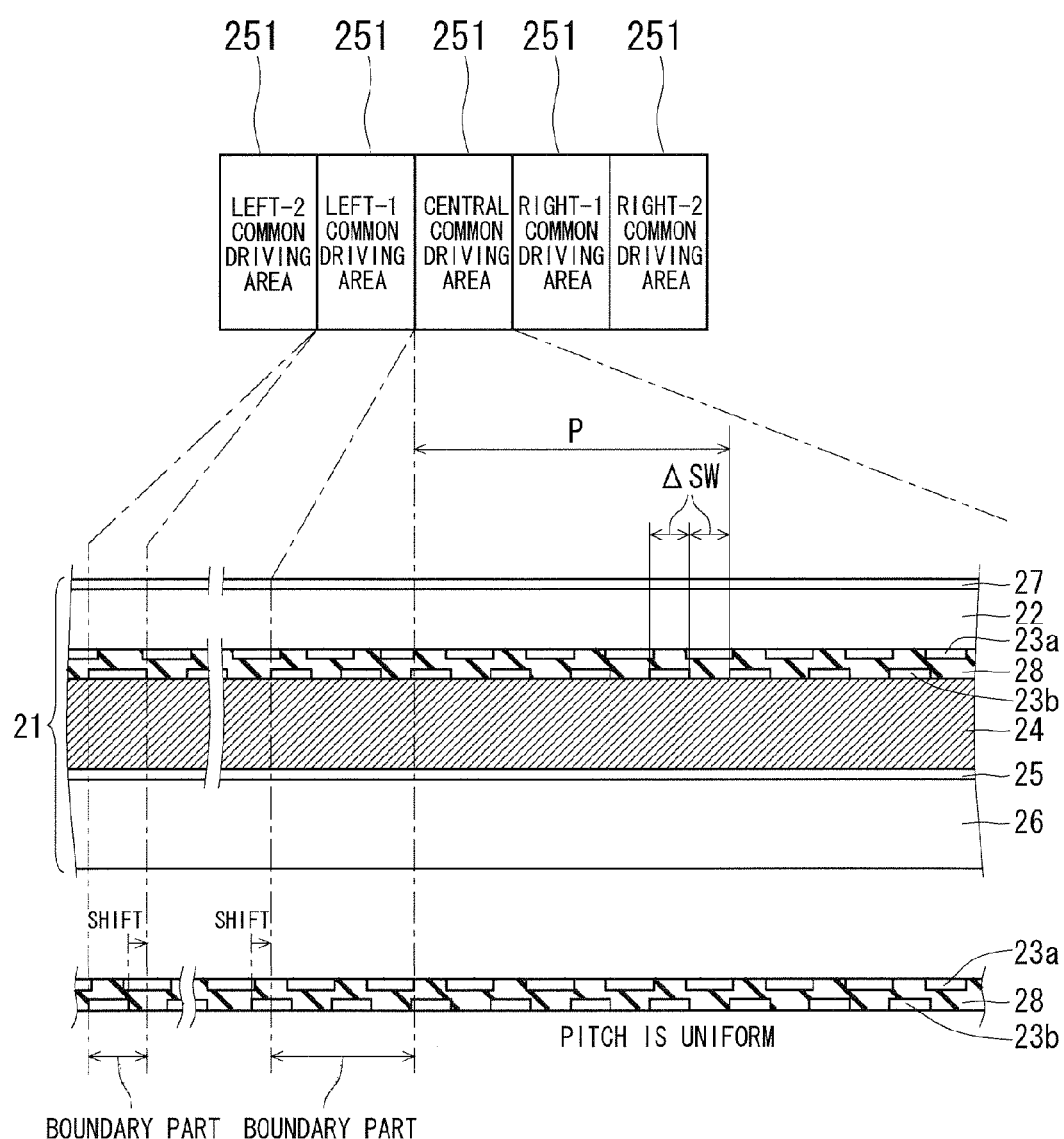
FIG. 27 is a sectional view illustrating a configuration of a parallax barrier shutter panel in a display device according to a third preferred embodiment.

FIG. 27 illustrates a cross-sectional structure of the parallax barrier shutter panel 21 on a glasses-free 3D display according to a third preferred embodiment. In the description of the display device according to the present preferred embodiment, the components same as or similar to those described in the first and second preferred embodiments are identified by the same numerals, and the different point will mainly be described.

When the parallax barrier shutter panel 21 is combined to the display panel, the parallax barrier shutter panel 21 may be provided close to the observer than to the display panel 11 (anteriorly to the display panel 11), or when the liquid crystal display panel is used for the display panel 11, the parallax barrier shutter panel 21 may be provided between the backlight and the display panel 11 (posteriorly to the display panel 11).

The parallax barrier shutter panel 21 according to the third preferred embodiment is configured to be almost the same as the parallax barrier shutter panel 21 according to the first preferred embodiment. Specifically, the parallax barrier shutter panel 21 according to the present preferred embodiment includes two transparent electrodes (a first transparent substrate 22 and a second transparent substrate 26), a liquid crystal layer 24 held between these electrodes (these substrates), upper and lower first transparent electrodes 23a and 23b, a second transparent electrode 25, a display-surface polarizing plate 27 provided on the surface reverse to the liquid crystal layer 24, of the first transparent substrate 22, and a polarizing plate (not illustrated) provided on the surface close to the display panel 11, of the second transparent substrate 26. The upper and lower first transparent electrodes 23a and 23b are formed on the surface close to the liquid crystal layer 24, of the first transparent substrate 22, to extend in the longitudinal direction (in the depth direction in FIG. 27), while the second transparent electrode 25 is formed on the surface close the liquid crystal layer 24, of the second transparent substrate 26.

In the present preferred embodiment, instead of the plural first transparent electrodes 23 described in the first preferred embodiment, plural upper first transparent electrodes 23a and lower transparent electrodes 23b are formed. The plural upper first transparent electrodes 23a and lower first transparent electrodes 23b are formed by assigning the plural first transparent electrodes 23 described in the first preferred embodiment to plural layers (upper layer and lower layer) with an insulating film 28 (with a spaced manner).

The upper first transparent electrodes 23a are formed with a pitch corresponding to the reference parallax barrier pitch P divided into an even number (here, four). The lower first transparent electrodes 23b are also formed with a pitch corresponding to the reference parallax barrier pitch P divided into an even number (here, four). In a planar view, one electrode that is one of the upper first transparent electrode 23a and the lower first transparent electrode 23b (the first transparent electrode formed in one layer) is arranged in a gap between the other electrodes (between the first transparent electrodes formed on the other layer). In the present preferred embodiment, the upper first transparent electrode 23a and the lower first transparent electrode 23b are arranged in order that the end of one electrode and the end of the other electrode are overlapped.

For example, the thicknesses of the upper first transparent electrode 23a and the lower first transparent electrode 23b, and the thickness of the insulating film 28 sandwiched between the upper electrode and the lower electrode are about 100 nm, which is smaller than the thickness of the liquid crystal layer 24 of several μm. The width of the upper first transparent electrode 23a is larger than the width of the gap between the upper first transparent electrodes 23a, but the width of the lower first transparent electrode 23b is equal to the width of the gap between the lower first transparent electrodes 23b. The liquid crystal in the liquid crystal layer 24 can be driven by applying an electric field to the liquid crystal layer 24 between the second transparent electrode 25 and the upper and lower first transparent electrodes 23a and 23b. Therefore, the barrier position control with the sub-opening pitch ΔSW that is ⅛ (divided into four×2) of the reference parallax barrier pitch P can be done. The gap between the upper first transparent electrodes 23a and the gap between the lower first transparent electrodes 23b are both ⅛ of the reference parallax barrier pitch P, which means both gaps are larger than those in the first preferred embodiment illustrated in FIG. 1. Therefore, the display device according to the present preferred embodiment can prevent the occurrence of failure during the production process, such as short-circuit between the electrodes. Since the first transparent electrodes 23 that can apply an independent voltage are arranged without forming a gap, or they are arranged as being overlapped with each other, the light-shielding region with a predetermined width (reference parallax barrier pitch P) can be formed without having a gap in a planar view, whereby the light-shielding region (liquid crystal parallax barrier) can be moved in the horizontal direction with the unit of the sub-opening pitch ΔSW.

On the parallax barrier shutter panel 21 illustrated in FIG. 27, the sub-opening pitch ΔSW on the boundary part between the adjacent common driving areas 251 is different from the other sub-opening pitch ΔSW.

Specifically, the width of at least one of the upper first transparent electrode 23a and the lower first transparent electrode 23b and the width of the gap between the electrodes in the vicinity of the boundary of the common driving area 251 are made different from those in the part other than the vicinity of the boundary. With this structure, the arrangement of the upper first transparent electrode 23a and the lower first transparent electrode 23b in the common driving area 251 is shifted by a half of the width of the lower first transparent electrode 23b with respect to the arrangement of the upper first transparent electrode 23a and the lower first transparent electrode 23b in the adjacent common driving area 251.

This will more specifically be described through the comparison between the arrangement of the upper first transparent electrode 23a and the lower first transparent electrode 23b according to the present preferred embodiment (the upper figure in FIG. 27) and an arrangement (the lower figure in FIG. 27) of the upper first transparent electrode 23a and the lower first transparent electrode 23b with a uniform pitch (⅛ of the reference parallax barrier pitch P). As illustrated in FIG. 27, the width of the lower first transparent electrode 23b in the part other than the boundary part is ⅛ of the reference parallax barrier pitch P, while the width of the lower first transparent electrode 23b in the boundary part between the left-1 common driving area 251 and the left-2 common driving area 251 is formed to be wide such as ⅛×1.5 of the reference parallax barrier pitch P. The gap between the upper first transparent electrodes 23a whose end is overlapped with this lower first transparent electrode 23b is formed to be wide.

On the boundary part of the central common driving area 251 and the left-1 common driving area 251 (here, two upper first transparent electrodes 23a and two lower first transparent electrodes 23b), the width of the lower first transparent electrode 23b is formed to be narrower than ⅛ of the reference parallax barrier pitch P.

Thus, in the left-2 common driving area 251 and the central common driving area 251, the upper and lower first transparent electrodes 23a and 23b are arranged with the same cycle (pitch) and phase. On the other hand, the phase of the upper and lower first transparent electrodes 23a and 23b in the left-1 common driving area 251 is shifted from the phase of the upper and lower first transparent electrodes 23a and 23b in the left-2 common driving area 251 and the central common driving area 251 by 1/16 of the reference parallax barrier pitch P, although the cycle (pitch) is the same.

Figure 28:
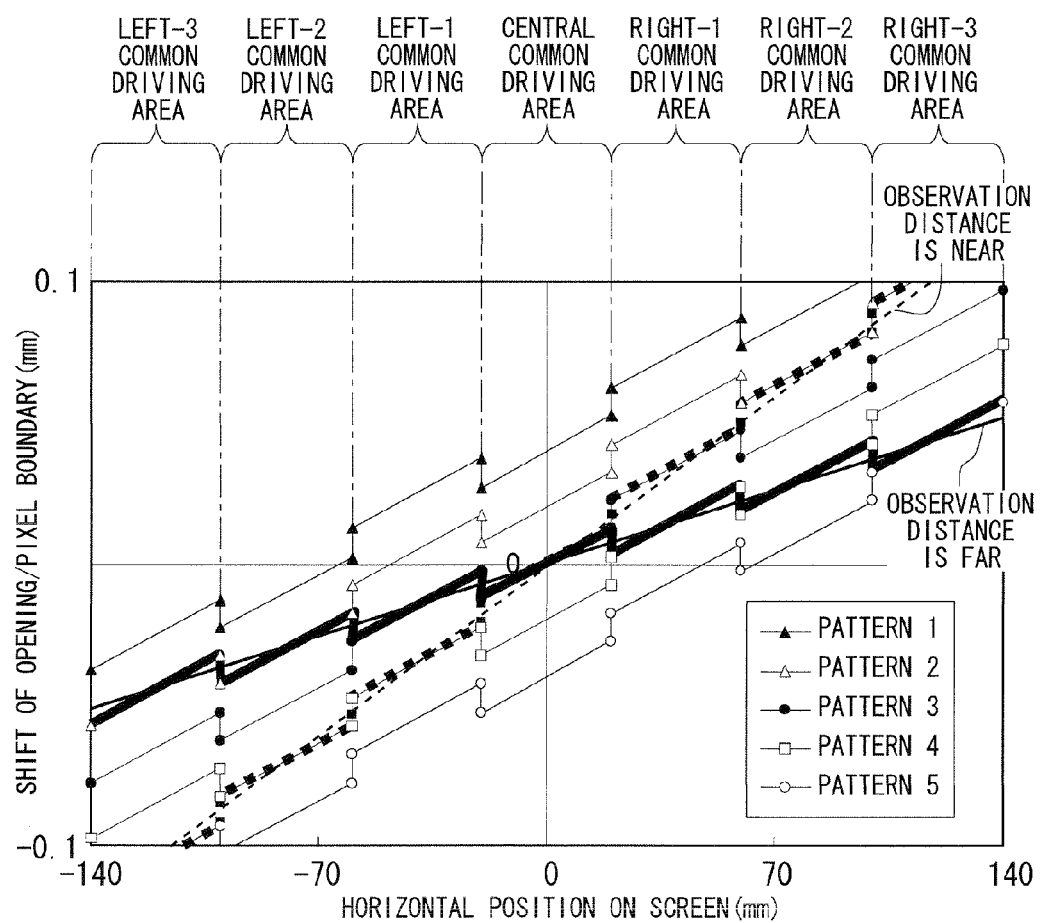

FIG. 28 illustrates an amount of shift between the center position of the boundary of the left and right sub-pixel pairs 41 on the screen, and the center position of the general opening 300, as in FIG. 26. The shift of the center position of the general opening 300 to the left from the center of the boundary of the left and right sub-pixel pairs 41 on the screen is the positive shift. The reference parallax barrier pitch P is 0.160 mm, and the sub-opening pitch ΔSW is 0.020 mm. The width of the screen is 280 mm, and the screen is divided into seven common driving areas 251.

FIG. 29 illustrates barrier driving patterns set for each of seven common driving areas 251, when the observation distance of the observer is equal to the designed visible distance (1000 mm), when the observation distance is shorter than the designed visible distance (700 mm), and when the observation distance is longer than the designed visible distance (1500 mm).

A group of the patterns for the far case illustrated in FIG. 29 is used for the observer who is on the front of the glasses-free 3D display and apart from the display (1500 mm) With this, the shift distribution that is indicated by a bold solid line with a saw-tooth shape in FIG. 28 and that is generated because of the structure of the device can be realized on the screen. The difference between this shift distribution and the ideal shift distribution indicated by a linear solid line is small such as within ¼ of the sub-opening pitch ΔSW, so that this shift distribution is close to the ideal distribution. The variation in the shift in the boundary part between the common driving areas 251 is ½ of the sub-opening pitch ΔSW. Therefore, the brightness variation in the boundary part of the common driving areas 251 can be reduced.

On the other hand, a group of the patterns for the near case illustrated in FIG. 29 is used for the observer who is on the front of the glasses-free 3D display and near the display (700 mm) With this, the shift distribution that is indicated by a bold broken line with a saw-tooth shape in FIG. 28 and that is generated because of the structure of the device can be realized on the screen. The difference between this shift distribution and the ideal shift distribution indicated by a linear broken line is small such as within ¼ of the sub-opening pitch ΔSW, so that this shift distribution is close to the ideal distribution, as in the far case. The variation in the shift in the boundary part between the common driving areas 251 is ½ of the sub-opening pitch ΔSW. Therefore, the brightness variation in the boundary part of the common driving areas 251 can be reduced, as in the near case.

In summary, in the display device according to the second preferred embodiment, the variation in the shift in the boundary part between the common driving areas 251 is equal to the sub-opening pitch ΔSW, while the display device according to the present preferred embodiment can halve the variation in the shift. Consequently, the display device according to the present preferred embodiment can reduce the variation and difference in the brightness or color in the boundary part between the common driving areas 251, even when the width of the first transparent electrode 23 cannot be made small.

<Fourth Preferred Embodiment>

FIG. 30 illustrates a cross-sectional structure of the parallax barrier shutter panel 21 on a glasses-free 3D display according to a fourth preferred embodiment. In the description of the display device according to the present preferred embodiment, the components same as or similar to those described in the first to third preferred embodiments are identified by the same numerals, and the different point will mainly be described.

The parallax barrier shutter panel 21 according to the fourth preferred embodiment is configured to be almost the same as the parallax barrier shutter panel 21 according to the third preferred embodiment. The parallax barrier shutter panel 21 according to the present preferred embodiment is different from that in the third preferred embodiment in that a middle first transparent electrode 23c is formed between the upper first transparent electrode 23a and the lower first transparent electrode 23b. Specifically, in the present preferred embodiment, the plural upper first transparent electrodes 23a, the lower first transparent electrodes 23b, and the middle first transparent electrodes 23c are formed by assigning the plural first transparent electrodes 23 described in the first preferred embodiment to plural layers (upper layer, middle layer, and lower layer) with the insulating film 28 (with a spaced manner).

The sub-opening pitch ΔSW in the boundary part between the adjacent common driving areas 251 is different from the other sub-opening pitch ΔSW in the third preferred embodiment. However, in the present preferred embodiment, it is not different from the other pitch, which is different from the third preferred embodiment. However, the present preferred embodiment is not limited thereto, and the sub-opening pitch ΔSW may be made different as in the fourth preferred embodiment.

The upper transparent electrodes 23a are formed with a pitch corresponding to the reference parallax barrier pitch P divided into an even number (here, four). Similarly, the lower transparent electrodes 23b and the middle first transparent electrodes 23c are also formed with a pitch corresponding to the reference parallax barrier pitch P divided into an even number (here, four). The upper first transparent electrode 23a (the first transparent electrode formed in one layer) is arranged in a gap between the lower first transparent electrodes 23b and the middle first transparent electrodes 23c (between the first transparent electrodes formed on the other layer), for example.

For example, the thicknesses of the upper first transparent electrode 23a, the lower first transparent electrode 23b, and the middle first transparent electrode 23c, and the thickness of the insulating film 28 sandwiched between the upper electrode and the middle electrode or between the middle electrode and the lower electrode are about 100 nm, which is smaller than the thickness of the liquid crystal layer 24 of several μm. The width of the upper first transparent electrode 23a and the width of the middle first transparent electrode 23c are larger than ½ of the gap between the upper first transparent electrodes 23a and the gap between the middle first transparent electrodes 23c respectively, but the width of the lower first transparent electrode 23b is equal to ½ of the gap between the lower first transparent electrodes 23b.

The liquid crystal in the liquid crystal layer 24 can be driven by applying an electric field to the liquid crystal layer 24 between the second transparent electrode 25 and the upper, lower, and middle first transparent electrodes 23a, 23b, and 23c. Therefore, the barrier position control with the sub-opening pitch ΔSW that is ¹⁄₁₂ (divided into four×3) of the reference parallax barrier pitch P can be done.

The gap between the upper first transparent electrodes 23a, the gap between the lower first transparent electrodes 23b, and the gap between the middle first transparent electrodes 23c are ²⁄₁₂=⅙ of the reference parallax barrier pitch P, which is larger than the gaps (⅛ of the reference parallax barrier pitch P) in the third preferred embodiment illustrated in FIG. 27. Therefore, the display device according to the present preferred embodiment can prevent the occurrence of failure during the production process, such as short-circuit between the electrodes. Since the first transparent electrodes 23 that can apply an independent voltage are arranged without forming a gap, or they are arranged as being overlapped with each other, the light-shielding region with a predetermined width (reference parallax barrier pitch P) can be formed without having a gap in a planar view, whereby the light-shielding region (liquid crystal parallax barrier) can be moved in the horizontal direction with the unit of the sub-opening pitch ΔSW without a gap.

<Fifth Preferred Embodiment>

In the second preferred embodiment, sub-pixels 411 of main three colors (e.g., sub-pixels of three colors of red (R), green (G), and blue (B)) are arranged on the display panel 11 in the lateral direction, and the general opening 300 of the parallax barrier shutter panel 21 is arranged in a checkered flag pattern, in order to reduce deterioration in a sense of resolution of an image displayed in one direction (FIG. 23).

However, when the parallax barrier shutter panel 21 in which the general opening 300 is arranged in the checkered flag pattern and the display panel 11 are assembled, the positioning is needed in the horizontal direction and in the vertical direction. Thus, the assembling work is somewhat difficult.

On the other hand, when the general opening 300 on the parallax barrier shutter panel 21 is arranged in vertical stripes, the positioning of the parallax barrier shutter panel 21 and the display panel 11 in the vertical direction is not needed, so that the assembling work is relatively easy, although the reduction in the deterioration in the sense of resolution cannot be expected.

The reason why the deterioration in the sense of resolution cannot be reduced by the vertical stripes arrangement of the general opening 300 on the parallax barrier shutter panel 21 will be described below, while the deterioration in the sense of resolution can be reduced by the checkered flag pattern of the general opening 300 on the parallax barrier shutter panel 21. It is supposed that the sub-pixels 411 are arranged in a matrix.

Figure 31A:
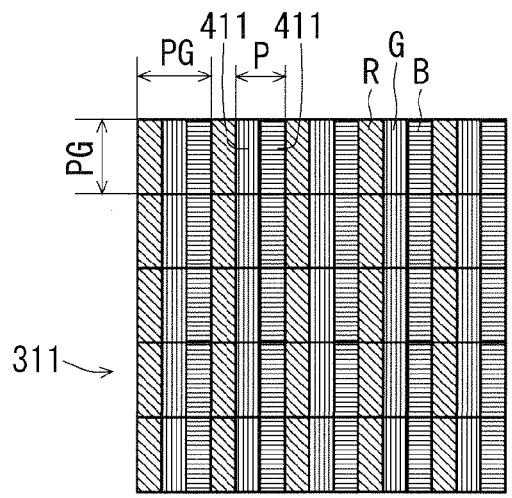
FIGS. 31A, 31B and 31C are views illustrating an image displayed on a related display panel.

On a display panel 311 (hereinafter referred to as the "related display panel 311") related with the present preferred embodiment illustrated in FIG. 31A, the sub-pixels 411 of main three colors (e.g., the sub-pixels 411 of three colors of red (R), green (G), and blue (B)) are arranged such that the sub-pixels of the same color are arranged in a row direction (longitudinal direction) and the sub-pixel of each of three colors is sequentially arranged in a line direction (lateral direction). On the related display panel 311, the space (pixel pitch) between the same color and the adjacent same color is PG.

Figure 31B:
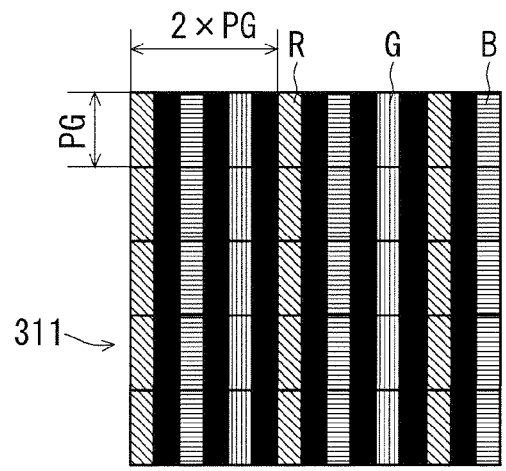

When the related display panel 311 and the parallax barrier shutter panel 21 on which the general opening 300 is arranged in the vertical stripes are assembled, the lateral pixel pitch of an image that can be seen from one direction is twice the original pitch PG of the related display panel 311 as illustrated in FIG. 31B, so that the image becomes grainy.

Figure 31C:
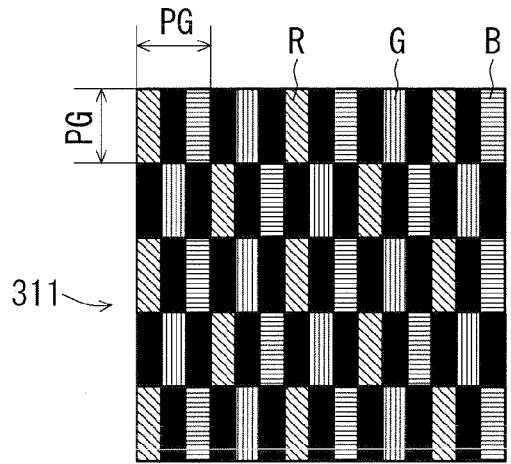

When the related display panel 311 and the parallax barrier shutter panel 21 on which the general opening 300 is arranged in the checkered flag pattern are assembled, the lateral pixel pitch of an image that can be seen from one direction is equal to the original pitch PG of the related display panel 311 as illustrated in FIG. 31C. Therefore, the parallax barrier shutter panel 21 on which the general opening 300 is arranged in the checkered flag pattern can reduce the deterioration in the sense of resolution.

In view of this, the display panel 11 of the display device according to the fifth preferred embodiment can reduce the deterioration in the sense of resolution, even if the parallax barrier shutter panel 21 on which the general opening 300 is arranged in the vertical stripes is used. In the description of the display device according to the present preferred embodiment, the components same as or similar to those described in the first to fourth preferred embodiments are identified by the same numerals, and the different point will mainly be described.

Figure 32A:
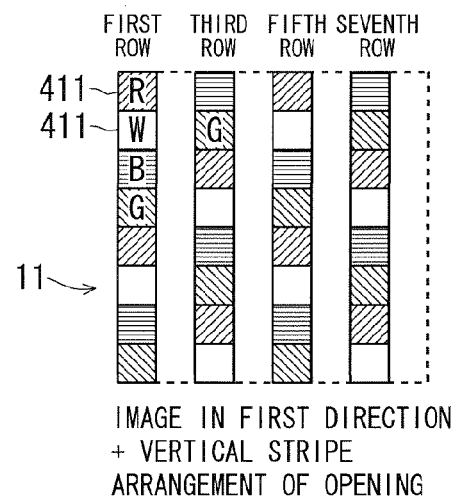
FIGS. 32A, 32B and 32C are plan views illustrating an arrangement of sub-pixels on a display panel of a display device according to a fifth preferred embodiment.
Figure 32B:
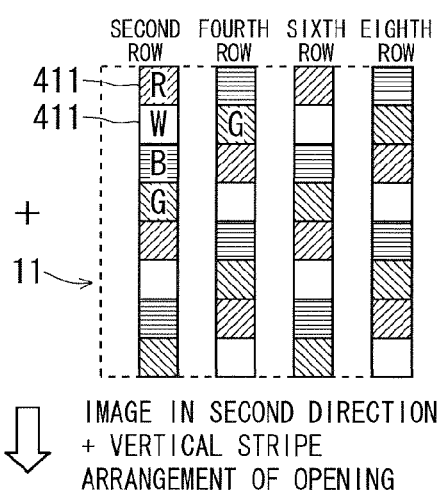
Figure 32C:
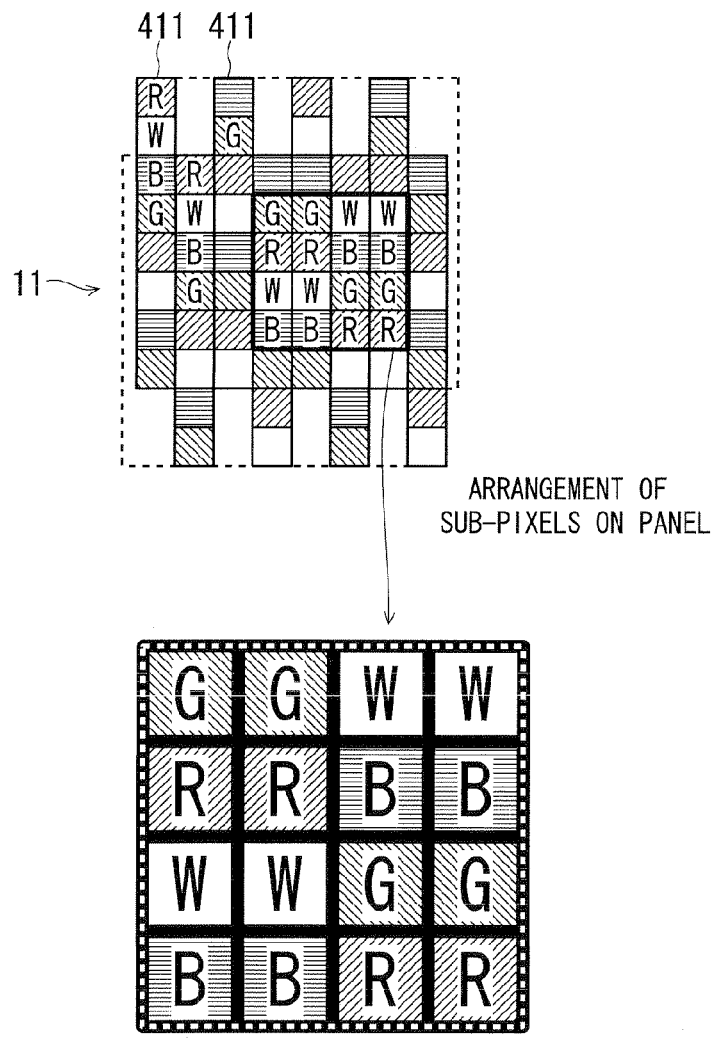

FIG. 32A to FIG. 32C are plan views illustrating an arrangement of the sub-pixels 411 on the display panel 11 in the display device according to the fifth preferred embodiment. The pixels of the display panel 11 include sub-pixels 411 of first main color (white, W), second main color (green, W), third main color (red, R), and fourth main color (blue, B) decreasing the brightness in this order.

The 4×4 sub-pixels 411 in a matrix indicated by an outlined broken line in FIG. 32C will be described. The 4×4 sub-pixels 411 in a matrix forms one unit, and this unit is formed repetitively in the longitudinal direction and in the lateral direction The first to fourth main colors are assigned to four sub-pixels 411 in each row of 4×4 sub-pixels 411 in a matrix on one-to-one basis. As for four sub-pixels 411 in one row, one sub-pixel 411 to which the third main color (R) or the fourth main color (B) is assigned is arranged between the sub-pixel 411 to which the first main color (W) is assigned and the sub-pixel 411 to which the second main color (G) is assigned.

In the 4×4 sub-pixels 411 in a matrix, the sub-pixel 411 in the first row to which the first main color (W) is assigned and the sub-pixel 411 in the third row to which the second main color (G) is assigned are arranged on the same line. Similarly, in the 4×4 sub-pixels 411 in a matrix, the sub-pixels 411 in the first row to which the second main color (G), the third main color (R), and the fourth main color (B) are assigned and the sub-pixel 411 in the third row to which the first main color (W), the fourth main color (B), and the third main color (R) are assigned are arranged on the same lines, respectively.

Similarly, in the 4×4 sub-pixels 411 in a matrix, the sub-pixels 411 in the second row to which the first main color (W), the second main color (G), the third main color (R), and the fourth main color (B) are assigned and the sub-pixels 411 in the fourth row to which the second main color (G), the first main color (W), the fourth main color (B), and the third main color (B) are assigned row are arranged on the same lines, respectively.

Figure 33A:
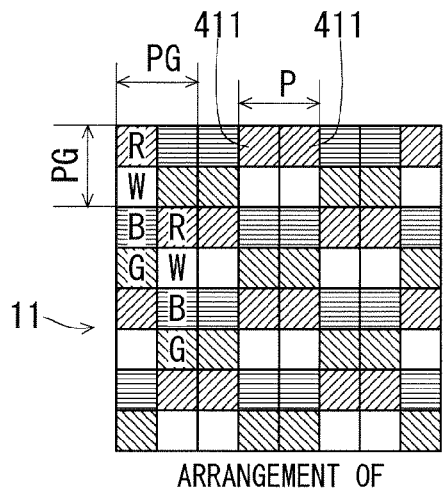
FIGS. 33A, 33B and 33C are views for describing an operation of the display panel of the display device according to the fifth preferred embodiment.
Figure 33B:
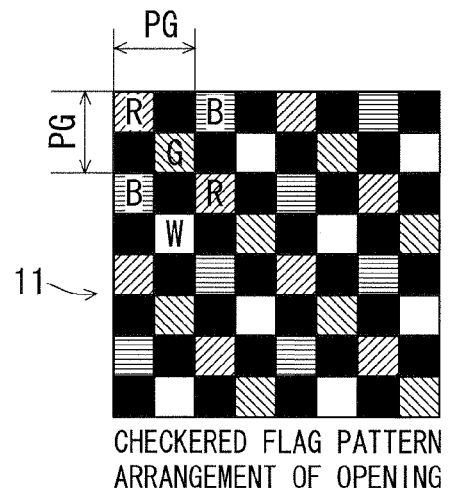
Figure 33C:
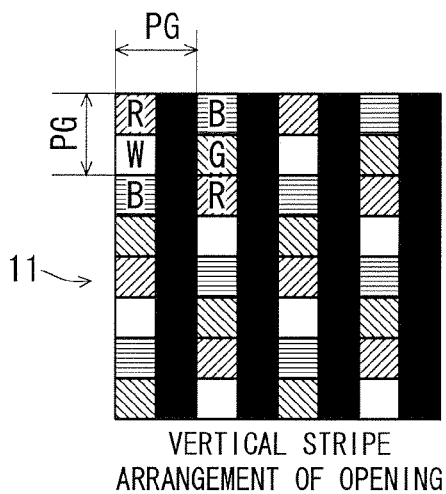
Figure 34A:
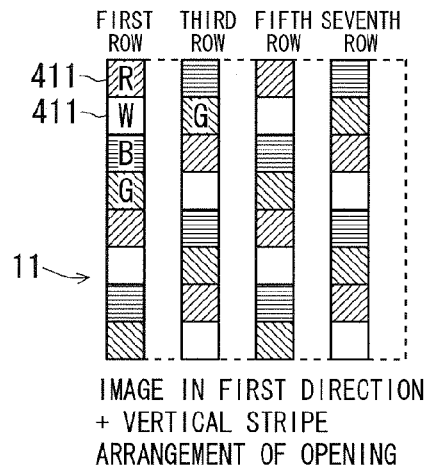
FIGS. 34A, 34B and 34C are plan views illustrating an arrangement of sub-pixels on another display panel of the display device according to the fifth preferred embodiment.
Figure 34B:
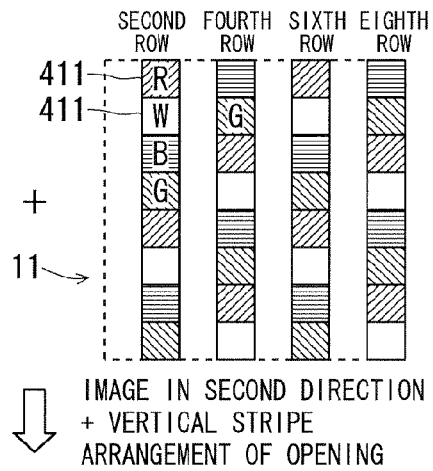
Figure 34C:
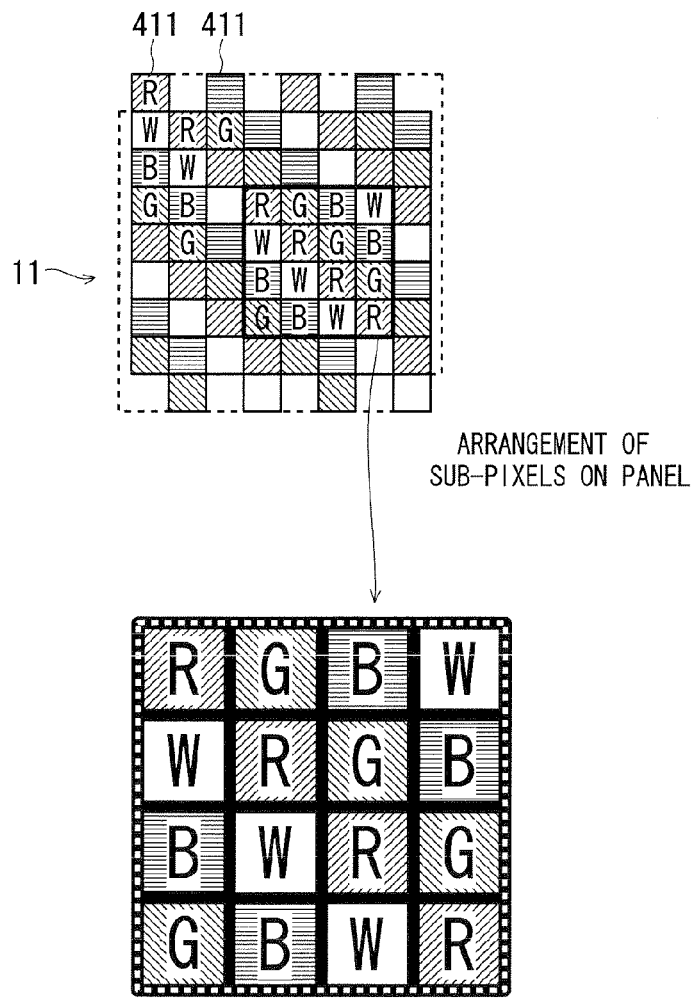

FIG. 33A to FIG. 33C illustrate the arrangement of the sub-pixels 411 of the respective main colors seen from the first observation direction, when the display panel 11 according to the present preferred embodiment is combined to the parallax barrier shutter panel 21. Even when the general opening 300 on the parallax barrier shutter panel 21 is arranged in the vertical stripes, the pixel pitch of the respective main colors in the longitudinal direction and in the lateral direction viewed from the first observation direction is PG that is the same as the pitch in the case where the general opening 300 is arranged in the checkered flag pattern. The same applies to the case where the respective main colors are viewed from the second observation direction.

Specifically, according to the display device of the present preferred embodiment, even when the general opening 300 on the parallax barrier shutter panel 21 is arranged in the vertical stripes, the pixel pitch becomes equal to the original pixel pitch PG of the display panel 11, whereby the deterioration in the sense of resolution during the display with monochrome color can be reduced, the assembling work can be facilitated, and the yield can be expected to be enhanced. In the image viewed from one direction, the sub-pixel 411 of the second main color (green, G) is arranged on the center of a rhombus having the sub-pixel 411 of the first main color (white, W) as an apex. Therefore, bright points are uniformly arranged, whereby the sense of resolution can be enhanced. By adding the bright sub-pixel 411 of white (W) to three primary colors of red (R), green (G), and blue (B), it is expected that the light use efficiency is enhanced, and the color gamut is increased. Since the vertical-stripe optical induction member can be used, the improvement in the light use efficiency can be expected.

The point of the display panel 11 in the display device according to the fifth preferred embodiment of the present invention bringing the effect described above is that the sub-pixels 411 in the first row to which the first main color (W) and the second main color (G) are assigned and the sub-pixels 411 in the third row to which the second main color (G) and the first main color (W) are assigned are arranged on the same lines, respectively, as for the first row and the third row viewed from the first observation direction, when the display panel is combined to the vertical-stripe parallax barrier shutter panel 21. As for the second row and the fourth row viewed from the second observation direction in the combination described above, the sub-pixels 411 in the second row to which the first main color (W) and the second main color (G) are assigned and the sub-pixels 411 in the fourth row to which the second main color (G) and the first main color (W) are assigned are arranged on the same lines, respectively.

Therefore, not only the display panels 11 illustrated in FIGS. 32A to 32C, but also display panels 11 illustrated in FIGS. 34A, 34B, 34C, 35A, 35B and 35C can bring the similar effect. The display panels 11 illustrated in FIGS. 34A, 34B, 34C, 35A, 35B and 35C are the same as the display panels 11 illustrated in FIGS. 32A to 32C in that they have the above-mentioned point, but they are different from the display panels in FIGS. 32A to 32C in that the first main color (white, W) or other color is obliquely arranged from the first row to the fourth row. The configurations illustrated in FIGS. 34A 34B, 34C, 35A, 35B and 35C can bring the sense of smooth resolution, when the parallax barrier shutter panel 21 is put into a completely transmittance state.

In the present preferred embodiment, in the 4×4 sub-pixels 411 in a matrix, the sub-pixels 411 in the first row to which the third main color (R) and the fourth main color (B) are assigned and the sub-pixels 411 in the third row to which the fourth main color (B) and the third main color (R) are assigned are arranged on the same lines, respectively. The sub-pixels 411 in the second row to which the third main color (R) and the fourth main color (B) are assigned and the sub-pixels 411 in the fourth row to which the fourth main color (B) and the third main color (R) are assigned are arranged on the same lines, respectively. This configuration can enhance the above-mentioned effect.

In the description above, the display panel 11 is composed of the sub-pixels 411 of the first main color (W), the second main color (G), the third main color (R), and the fourth main color (B). However, the present invention is not limited thereto. The display panel may be composed of the sub-pixels 411 of the first main color (yellow, Y), the second main color (green, G), the third main color (red, R), and the fourth main color (blue, B).

In the description above, the parallax barrier shutter panel 21 (optical induction member) having the vertical-stripe opening and the display panel 11 are combined. However, the present invention is not limited thereto. The same effect can also be obtained by the structure in which a light deflection optical element (optical induction member) such as a lenticular lens or simple parallax barrier and the display panel 11 are combined.

While the invention has been shown and described in detail, the forgoing description is in all aspects illustrative and not restrictive. It is therefore understood that numerous modifications and variations can be devised without departing from the scope of the invention.

What is claimed is:

1. A display device that can simultaneously display two images, the device comprising:
   a display panel on which a sub-pixel pair including two sub-pixels for displaying said two images, is arranged in a lateral direction; and
   a parallax barrier shutter panel that is arranged anteriorly to or posteriorly to said display panel, and on which sub-openings that can be changed between a light transmittance state and a light-shielding state according to an electric control are arranged in the lateral direction, wherein
   adjacent plural said sub-openings on said parallax barrier shutter panel are put into the light transmittance state, and the other sub-openings on said parallax barrier shutter panel are put into the light-shielding state, within a region of a reference pitch corresponding to each of said sub-pixel pairs on said display panel, so that a general opening is formed,
   said parallax barrier shutter panel includes two transparent substrates, a liquid crystal layer held between the transparent substrates, and plural first transparent electrodes formed on a surface close to said liquid crystal layer, of one of said two transparent substrates, and extending in a longitudinal direction, and said plural first transparent electrodes are assigned to plural layers with a spaced manner and an insulating layer disposed there between, wherein said first transparent electrode formed in one layer is arranged in a gap between said first transparent electrodes formed in the other layer in a planar view.

2. The display device according to claim 1, wherein said sub-pixel pair of said display panel is arranged in a longitudinal direction, said display device further comprises an optical induction member having openings which are arranged in a vertical stripe, and guide light emitted from said sub-pixel displaying a left image among said two images and light emitted from said sub-pixel displaying a right image among said two images in different directions, a first main color, a second main color, a third main color, and a fourth main color, decreasing the brightness in this order, are assigned on one-to-one basis to four of said sub-pixels in each row in said sub-pixels of a 4×4 matrix repetitively arranged in the longitudinal direction and in the lateral direction, one of said sub-pixels to which said third main color or said fourth main color is assigned is arranged between said sub-pixel to which said first main color is assigned and said sub-pixel to which said second main color is assigned, as for said four sub-pixels in each row, said sub-pixels in the first row to which said first main color and said second main color are assigned and said sub-pixels in the third row to which said second main color and said first main color are assigned are arranged on the same lines, respectively, and said sub-pixels in the second row to which said first main color and said second main color are assigned and said sub-pixels in the fourth row to which said second main color and said first main color are assigned are arranged on the same lines, respectively.

3. The display device according to claim 2, wherein in said sub-pixels of said 4×4 matrix, said sub-pixels in the first row to which said third main color and said fourth main color are assigned and said sub-pixels in the third row to which said fourth main color and said third main color are assigned are arranged on the same lines, respectively, and said sub-pixels in the second row to which said third main color and said fourth main color are assigned and said sub-pixels in the fourth row to which said fourth main color and said third main color are assigned are arranged on the same lines, respectively.

\* \* \* \* \*